(12) United States Patent
Costa et al.

(10) Patent No.: US 7,603,715 B2
(45) Date of Patent: Oct. 13, 2009

(54) CONTAINMENT OF WORMS

(75) Inventors: Manuel Costa, Cambridge (GB);
Miguel Castro, Cambridge (GB);
Antony Rowstron, Cambridge (GB);
Jon Crowcroft, London (GB)

(73) Assignee: Microsoft Corporation, Redmond, WA (US)

( * ) Notice: Subject to any disclaimer, the term of this patent is extended or adjusted under 35 U.S.C. 154(b) by 927 days.

(21) Appl. No.: 11/096,054

(22) Filed: Mar. 30, 2005

(65) Prior Publication Data

US 2006/0021054 A1    Jan. 26, 2006

Related U.S. Application Data

(60) Provisional application No. 60/589,932, filed on Jul. 21, 2004.

(51) Int. Cl.
*G06F 12/14* (2006.01)
(52) U.S. Cl. .......................................... 726/25; 726/22
(58) Field of Classification Search .................... 726/25
See application file for complete search history.

(56) References Cited

U.S. PATENT DOCUMENTS

| | | | |
|---|---|---|---|
| 5,978,475 A | 11/1999 | Schneier et al. | |
| 6,393,568 B1 | 5/2002 | Ranger et al. | |
| 7,334,262 B2 * | 2/2008 | Szor ............................ | 726/22 |
| 7,418,729 B2 * | 8/2008 | Szor ............................ | 726/22 |
| 2002/0144149 A1 | 10/2002 | Hanna et al. | |
| 2002/0178375 A1 | 11/2002 | Whittaker et al. | |
| 2002/0199120 A1 | 12/2002 | Schmidt | |
| 2003/0014667 A1 * | 1/2003 | Kolichtchak ................. | 713/201 |
| 2003/0105973 A1 | 6/2003 | Liang et al. | |
| 2004/0015719 A1 | 1/2004 | Lee et al. | |
| 2004/0158725 A1 | 8/2004 | Szor et al. | |
| 2004/0250124 A1 | 12/2004 | Chesla et al. | |
| 2005/0251862 A1 * | 11/2005 | Talvitie ........................ | 726/24 |
| 2006/0161813 A1 * | 7/2006 | Largman et al. ............... | 714/20 |
| 2008/0209562 A1 * | 8/2008 | Szor ............................ | 726/24 |

FOREIGN PATENT DOCUMENTS

WO    WO 03003207    1/2003

(Continued)

OTHER PUBLICATIONS

Castro et al., "Secure routing for structured P2P overlay networks," 5th Usenix Symp. On Operating System Design and Implementation, Dec. 2002, pp. 299-314.

(Continued)

*Primary Examiner*—Matthew B Smithers
(74) *Attorney, Agent, or Firm*—Turk IP Law, LLC

(57) ABSTRACT

One aspect of the invention is a vulnerability detection mechanism that can detect a large class of attacks through dynamic dataflow analysis. Another aspect of the invention includes self-certifying alerts as the basis for safely sharing knowledge about worms. Another aspect of the invention is a resilient and self-organizing protocol to propagate alerts to all non-infected nodes in a timely fashion, even when under active attack during a worm outbreak. Another aspect of the invention is a system architecture that enables a large number of mutually untrusting computers to collaborate in the task of stopping a previously unknown worm, even when the worm is spreading rapidly and exploiting unknown vulnerabilities in popular software packages.

20 Claims, 18 Drawing Sheets

FOREIGN PATENT DOCUMENTS

| WO | WO 03021402 | 3/2003 |
|----|-------------|--------|
| WO | WO 03096607 | 11/2003 |

OTHER PUBLICATIONS

Costa et al., "Can We Contain Internet Worms," MSR-TR-2004-83, http://research.microsoft.com/research/pubs/view.aspx?tr_id=788, Aug. 2004, pp. 1-7.

Dabek et al., "Towards a Common API for Structured Peer-to-Peer Overlays," 2nd Int'l Workshop on P2P Systems, Feb. 2003, pp. 33-44.

Dunlap et al., "Revirt: enabling intrusion analysis through virtual-machine logging and replay," Operating Syst. Design and Implementation, Boston, Massachusetts, Dec. 2002.

Elnozahy et al., "A survey of rollback-recovery protocols in message passing systems," ACM Computing Surveys, vol. 32, No. 3, Sep. 2002, pp. 375-408.

Necula et al., "Safe Kernel Extensions Wihtout Run-Time Chekcing," 2nd Symp. On Operation System Design and Implementation, Oct. 1996, pp. 229-243.

Wilander et al., A Comparison of publicaly Available Tools for Dynamic Buffer Overflow Prevention, 10th Network and Distributed Sys. Security Symp., Feb. 2003, pp. 123-130.

"Solutions for Academic Institutions," http://www.netservers.co.uk/academic.html.

"A Network Monitoring Tool for Security—Nerd," http://www.terena.nl/tech/task-forces/tf-csirt/meeting10/NERD-coolen.pdf,. Sep. 25, 2003, pp. 1-10.

"MicroWorld Launches a Revolutionary Concept to Tackle the Content Security Threats," http://microworldtechnologies.com/antivirus/mwl1.asp.

Huang et al., "Web Application Security Assessment by Fault Injection and Behavior Monitoring," $12^{th}$ Int''l Conf. World Wide Web, May 21-25, 2003, Budapest, Hungary, pp. 148-159.

* cited by examiner $$(\rho, pc) \rightarrow \begin{cases} (\rho[r_d \leftarrow sel(r_m, n)], pc+1) & \text{if} & \prod_{pc} = MOV\ r_d, [n] \\ (\rho[r_d \leftarrow r_s], pc+1) & \text{if} & \prod_{pc} = MOV\ r_d, r_s \\ (\rho, pc+n) & \text{if} & \prod_{pc} = JZ\ n\ \text{and}\ ZF = 0 \\ (\rho, pc+1) & \text{if} & \prod_{pc} = JZ\ n\ \text{and}\ ZF = 1 \\ Post & \text{if} & \prod_{pc} = RET\ \text{and}\ \neg Worm(sel(r_m, ESP)) \\ (\rho[ZF \leftarrow 1], pc+1) & \text{if} & \prod_{pc} = CMP\ r_d, n\ \text{and}\ r_d = n \\ (\rho[ZF \leftarrow 0], pc+1) & \text{if} & \prod_{pc} = CMP\ r_d, n\ \text{and}\ r_d \neq n \\ \rho[r_m \leftarrow upd(r_m, rd, rs)], pc+1) & \text{if} & \prod_{pc} = MOV\ [r_d], rs \end{cases}$$

MOV EAX,[1234]  //move into register EAX the
         //contents of memory position 1234

MOV EBX,EAX    //move the contents of EAX into EBX
CMP ECX,10     //compare ECX with 10
JZ out         //jump to out if ECX is equal to 10
MOV [ESP],EBX  //push the contents of EBX into the
         //top of the stack out: RET      //load the value pointed to by ESP
         //into the instruction pointer

1500

```
      ⎧ mov al,byte ptr [netbuf] //move first byte into AL
1502 ⎨ mov cl,0x31 //move 0x31 into CL
      ⎪ cmp al,cl //compare AL to CL
      ⎩ jne out //jump if not equal
        xor eax,eax //move 0x0 into EAX
        loop:
        mov byte ptr [esp+eax+4],cl //move byte into
        //stack-based buffer
        mov cl,byte ptr [eax+netbuf+1]//move next byte into CL
        inc eax //increment EAX
        test cl,cl //test if CL is equal to 0x0
        jne loop //jump if not equal
        out:
```

```
VulnerableFunction(SOCKET s)
{
 char buffer[256];
 char buffer2[256];
 recv(s,buffer2,256,0) // reads data from the network
 DWORD oldProtect;
 VirtualProtect(buffer,256,PAGE_EXECUTE_READWRITE,&oldProtect);
 char c = buffer2[0];
 buffer[0] = c;
 for(int i=0; i<10; i++) {
   if(i == 4) {
   _asm
        {
          mov eax,0x0012fdd8 //address of buffer
          jmp eax          //jumps into buffer
        }
   }
  }
 }
```

*FIG. 17*

CONTAINMENT OF WORMS

CROSS-REFERENCE TO RELATED APPLICATION

This application claims the benefit of U.S. Provisional Patent Application Ser. No. 60/589,932, filed Jul. 21, 2004, which is incorporated herein by reference.

TECHNICAL FIELD

This description relates generally to computer security and more specifically to detecting, alerting, and/or reducing the spread of worms in a system of networked computers.

SUMMARY

The following presents a simplified summary of the disclosure in order to provide a basic understanding to the reader. This summary is not an extensive overview of the disclosure and it does not identify key or critical elements of the invention or delineate the scope of the invention. Its sole purpose is to present some concepts disclosed herein in a simplified form as a prelude to the more detailed description that is presented later.

Self-propagating programs, also known as worms, pose a threat to computers connected to the Internet. Worms exploit vulnerabilities in programs such as popular software packages to gain control of the infected machines. Thus, one long-term solution for this problem is to build software without vulnerabilities. However, until that time, software will continue to have vulnerabilities, and a worm containment system may be deployed to reduce the effects of worms. Since worms can spread rapidly, a containment system may be automated to detect and respond quickly and/or efficiently and may distribute alerts to another computing system node in the network.

One aspect of a containment system may include a detection system that can detect a large class of attacks through various techniques including dynamic flow analysis. Another aspect of a containment system may include generating and/or sending an alert as the basis for safely sharing knowledge about detected worms. An alert may contain information that proves that a given program has a vulnerability. The alert may be self-certifying such that its authenticity may be independently verified by a computing system. The containment system may include a resilient and/or self-organizing protocol to propagate alerts to non-infected nodes in a timely fashion, even when under active attack during a worm outbreak. The containment system may include a system architecture which enables a large number of mutually untrusting computers to collaborate in the task of containing a worm, even when the worm is spreading rapidly and exploiting unknown vulnerabilities in software packages. The containment system may include a protection system which may protect the computing device from future attacks.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 9 is a code listing for an example abstract machine;

FIG. 15 is an instruction listing of vulnerable instructions;

FIG. 17 is an example source code listing of a vulnerability to an arbitrary jump into an executable buffer.

Like reference numerals are used to designate like parts in the accompanying drawings.

DETAILED DESCRIPTION

Exemplary Operating Environment

Figure 1:
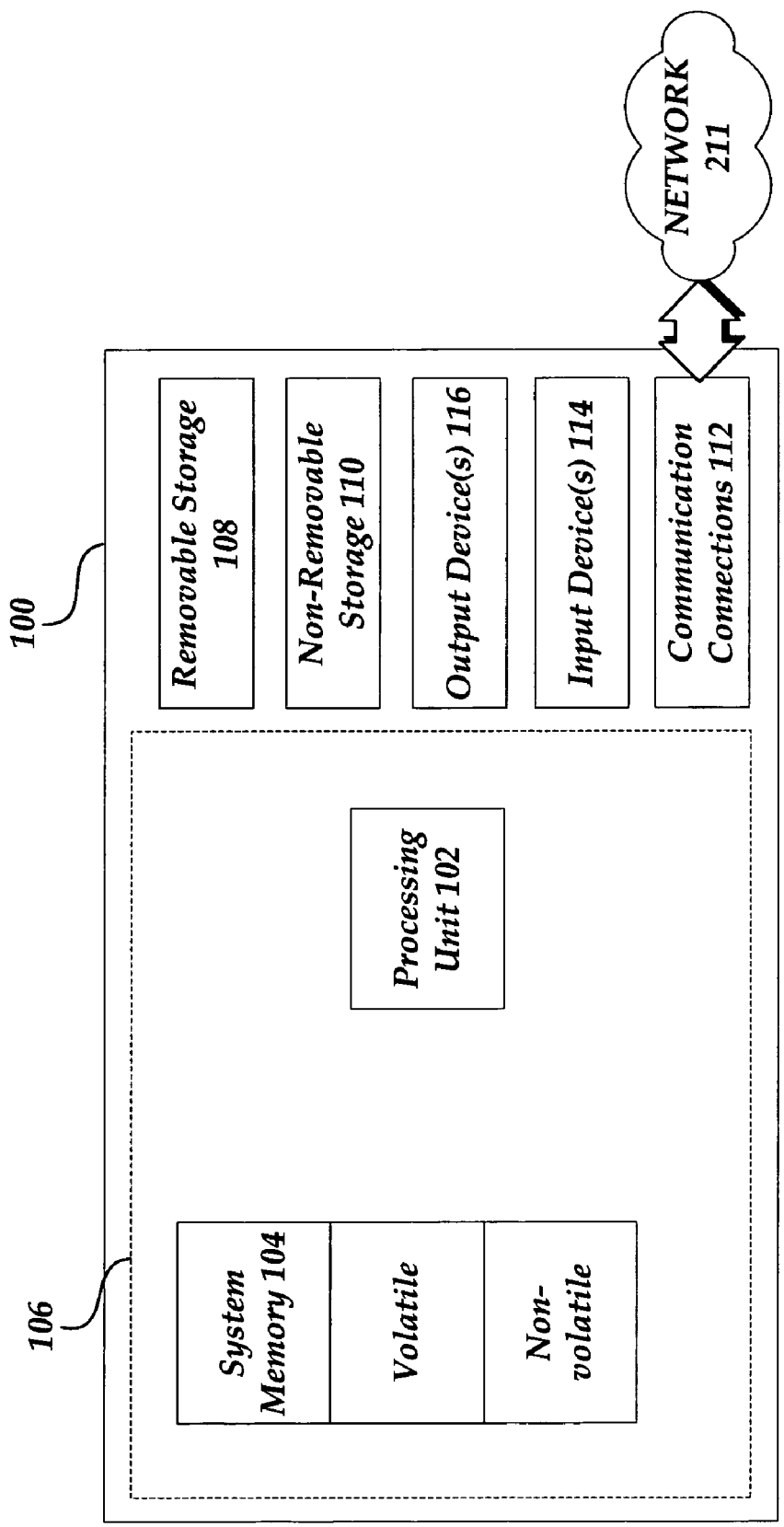
FIG. 1 is a is a schematic diagram of an example computing system for implementing a node of a network system.

FIG. 1 and the following discussion are intended to provide a brief, general description of a suitable computing environment in which all or a portion of a worm containment system may be implemented. The operating environment of FIG. 1 is only one example of a suitable operating environment and is not intended to suggest any limitation as to the scope of use or functionality of the operating environment. Other well known computing systems, environments, and/or configurations that may be suitable for use as a worm containment system described herein include, but are not limited to, personal computers, hand-held or laptop devices, multiprocessor systems, micro-processor based systems, programmable consumer electronics, network personal computers, server computers, mini computers, mainframe computers, distributed computing environments that include any of the above systems or devices, and the like.

Although not required, the worm containment system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments. In a distributed environment, program modules may be located in both local and remote computer-storage media including memory-storage devices.

With reference to FIG. 1, an exemplary system for implementing a worm containment system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and non-volatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communication connection(s) 1112 that allow the device 100 to communicate with other computing devices, such as other nodes within the computing system network 211. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both storage media and communication media.

Device 100 may also have input device(s) 114 such as keyboard, mouse, pen, voice input device, touch input device, laser range finder, infra-red cameras, video input devices, and/or any other input device. Output device(s) 116 such as display, speakers, printer, and/or any other output device may also be included.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. While the following description is described in the foregoing context, it is not meant to be limiting as those of skill in the art will appreciate that various of the acts and operations described hereinafter may also be implemented in hardware. For example, by utilizing conventional techniques known to those skilled in the art that all, or a portion of the software instructions may be carried out by a dedicated circuit, such as a DSP, programmable logic array, or the like.

The data structures where data are maintained are physical locations of the memory that have particular properties defined by the format of the data. Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network).

Figure 2:
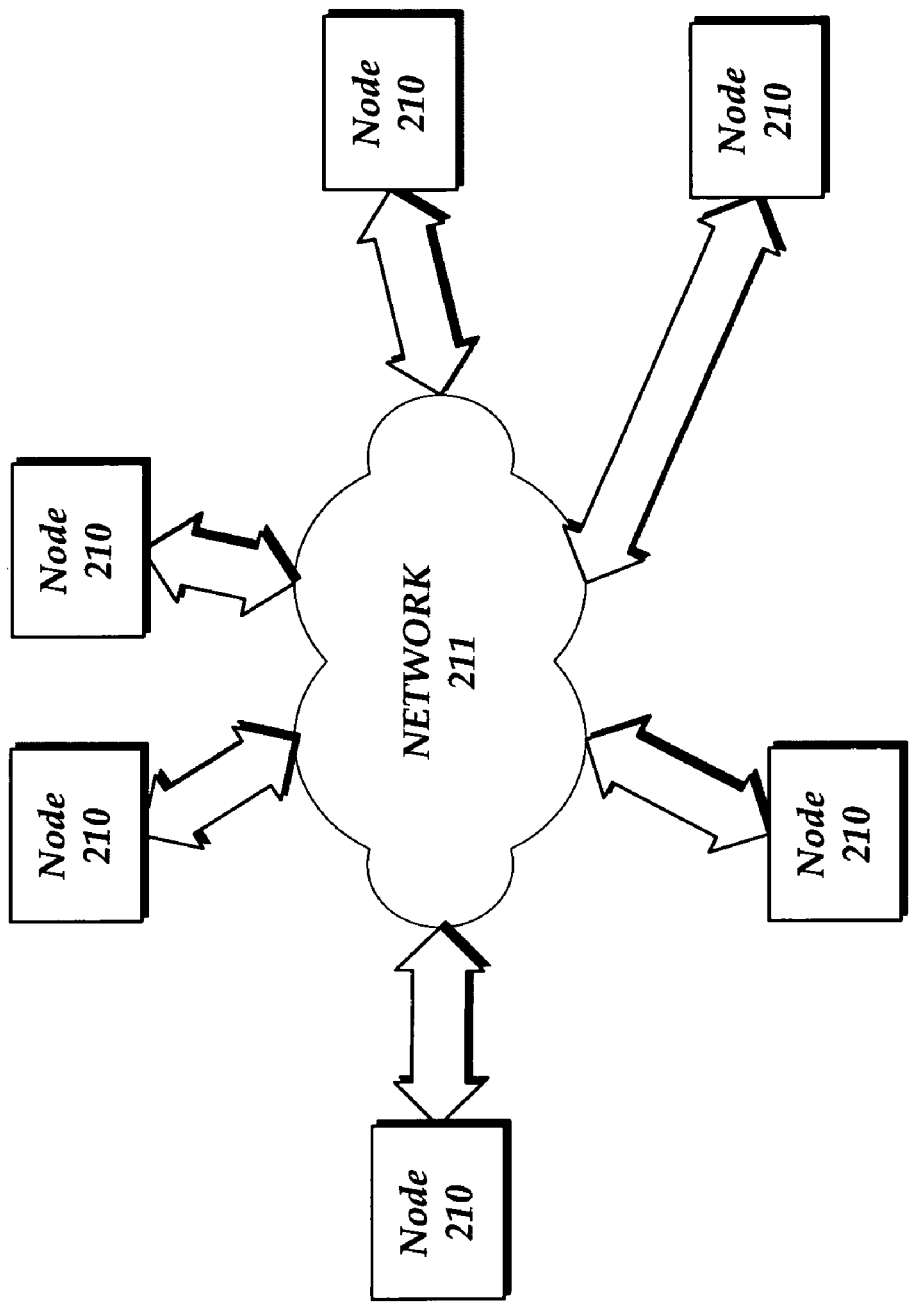
FIG. 2 is a schematic diagram of an example computing network.

An example of a networked environment in which a containment system may be used is described with reference to FIG. 2. The example network includes several computers or nodes 210 communicating with one another over a network 211, represented by a cloud. Network 211 may include many well-known components, such as routers, gateways, hubs, and the like and allows the nodes 210 to communicate via wired and/or wireless media. When interacting with one another over the network 211, one or more of the nodes may act as clients, network servers, or peers with respect to other nodes. Accordingly, the various examples of the containment system may be practiced on clients, network servers, peers, or combinations thereof, even though specific examples contained herein do not refer to all of these types of computers.

Worm Containment

A worm is typically introduced to a computing system through received data, such as a message, which may be stored in the computing system. The received and stored data may exploit storage characteristics of the computing system to create a vulnerability which allows the worm to attack and/or propagate. For example, many worms inject code into a vulnerable program and force the program to execute that code. Other worms may attack by remotely controlling execution of the vulnerable program without injecting new code.

Figure 3:
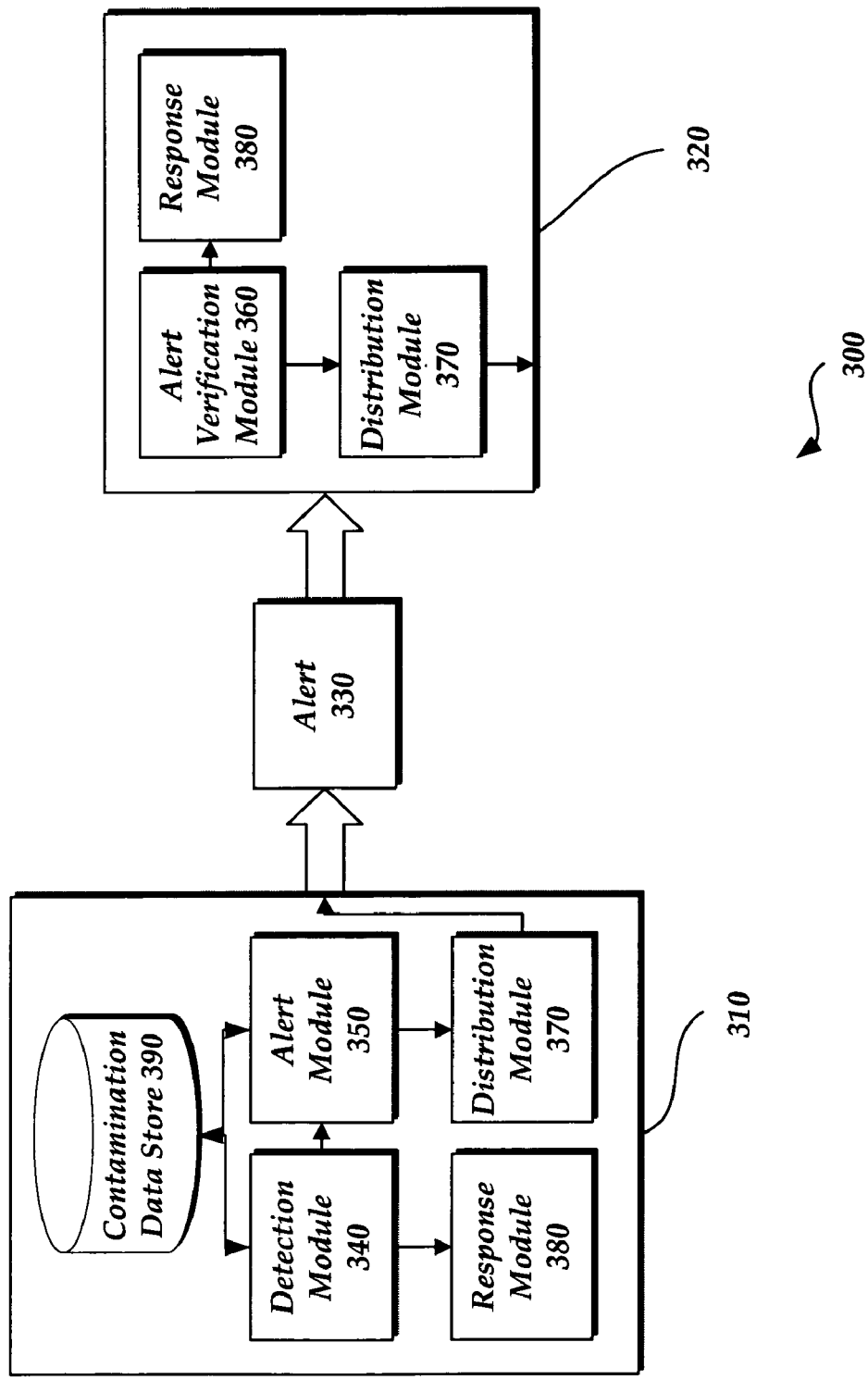
FIG. 3 is a dataflow diagram of an example containment system.

With reference to FIG. 3, a worm containment system 300 may include one or more of a detection module 340, an alert module 350, an alert verification module 360, a distribution module 370, and a response module 380. The detection module 340 may detect an attack on a computing system by a worm. The worm may be known or unknown prior to detection. It is to be appreciated that any worm detection system may be used as appropriate. A worm containment system 300 may run different detection modules 340 using different techniques and each detection module 340 may use one or more techniques to detect a worm. Any combination of suitable detection techniques may be used, including identifying received information as containing known worms; comparing received information with stored information to detect the presence of altered and unwanted files, detect changes in configuration, and/or verify a parameter value such as a return address; comparing the information expected to be stored with the information actually stored to detect buffer overwrites; detecting buffer overflow with a guard storage segment; implementing array bounds checking to directly detect buffer overflow and underflow; monitoring the run-time of a program and/or communication patterns and detecting any deviation from expected behavior; examining incoming data for a known worm signature such as string and/or message length; dynamic data flow analysis; and the like. Dynamic data flow analysis is described further below.

When a worm has been detected, the containment system may take action. For example, the alert module 350 may generate an alert 330 and send the alert to one or more computing systems to share knowledge about detected worms. The alert module may generate a self-certifying alert, which may be sent to one or more computing systems, and may contain information that proves that a given program has a vulnerability. The distribution of the alert may be determined by a distribution module 370, which may enable a large number of mutually untrusting computing systems to collaborate in containing the worm. The received self-certifying alert may be independently verified by a computing system receiving the self-certifying alert. The verification of a self-certifying alert may be performed by an alert verification module 360 of a receiving computing system 320.

The computing system detecting the worm and/or receiving the alert may take local action to cleanse and/or protect the system, reduce the detrimental effects of the worm, and/or prevent propagation of the worm through a response module 380. The exact protection mechanism employed by the response module 380 may vary from node to node and may be implemented as appropriate. For example, some nodes may simply stop the vulnerable software package; others may employ local patching and/or filtering procedures.

Detection with Dynamic Flow Analysis

Dynamic data flow analysis may detect the manner by which many different worms or variations of the same worm may gain control of a target program by exploiting a vulnerability. Accordingly, dynamic data flow analysis is not worm-centric, but vulnerability centric. Dynamic data flow analysis may detect unknown worms because it does not require a priori knowledge about the specific set of instructions that comprises a vulnerability or the specific set of actions that a worm uses to exploit that vulnerability. In this manner, dynamic data flow analysis may detect unknown worms. Many attacks used by worms involve injecting code into a vulnerable program and forcing it to execute that code. Another common attack mechanism is to remotely control the execution of the vulnerable program, without injecting any new code. For example, if the program has already loaded the C runtime, a worm may force the vulnerable program to call the system( ) function. Dynamic flow analysis may detect these two infection methods as well as others.

Dynamic flow analysis tracks data received in input operations (e.g., data received from network connections). The dynamic flow analysis may be implemented by the detection module 340 discussed above with reference to FIG. 3. More particularly, the detection module 340 may identify some storage locations of information as 'dirty', e.g., those storage locations which store information received from an outside source and/or storage locations which store information derived from information from an outside source. The detection module may selectively block execution of data stored at dirty locations and/or may selectively block loading of that data into an instruction pointer. In this manner, blocking execution and/or loading of dirty data into the instruction pointer may prevent or reduce execution of remotely loaded code and remote control of the execution. An instruction pointer or program counter is a register that contains the address or location of the instruction to be executed next in the program sequence.

The dynamic flow analysis, which tracks whether stored data is dirty or clean, may be performed in any suitable manner. For example, instructions, which store information from external sources, may be instrumented to keep track of which memory location and/or CPU registers contain dirty data received from input operations and/or derived from data received from input operation. The selection of instructions which are instrumented may include any appropriate instructions which read and/or write data, such as load and store operations (e.g. MOV, MOVS, PUSH, POP on x86 CPUs), arithmetic and logic instructions (e.g., ADD, MUL, XOR, AND, on x86 CPUs). All control transfer instructions (e.g. RET, CALL, JMP on x86 CPUs), or a subset deemed appropriate, may also be instrumented to implement the checks on the data loaded into the instruction pointer.

The dirty memory locations may be tracked in any suitable manner. For example, the dirty storage locations may be tracked in a contamination data store, which associates a dirty indicator with the storage location in a portion of the memory of a computing device. The portion of the memory may be a memory location, a register, an indication of an offset, and the like.

The dirty indicator may be any suitable indicator, which indicates that the information stored at the associated memory location is from an un-trusted outside source, which in some examples, may consider all other nodes sending information to be untrusted. For example, a dirty indicator may be a binary number, such that a 1 indicates that the associated data is dirty and a 0 indicates that the associated data is clean. In another example, the dirty indicator may be a message identifier such as an integer or alpha-numeric string, that indicates the message and/or source of the dirty information. In this manner, the dirty indicator may equal a unique message indicator if the data is dirty and may equal a default value, such as null or '0' if the data is 'clean.' In another example, the dirty indicator may be an identifier that indicates both the message and the offset within the message. In another example, the dirty indicator may be the identifier of a dataflow graph that includes a full sequence or relevant portion of a sequence of instructions that were used to compute the value at the dirty memory portion, from values in the message/source of dirty information.

The location of the associated memory portion which is dirty or clean, as indicated by the associated dirty indicator, may be indicated in any appropriate manner. In one example, the dirty indicator may be associated with a memory location indicator which indicates a particular location in memory. In another example, the placement of the dirty indicator in a vector of dirty indicators may indicate the memory location. For example, the first dirty indicator in a vector or array of dirty indicators may indicate a first memory location (such as the top of a stack), a second dirty indicator may indicate a second memory location (such as the second location down from the top of the stack), and the like.

In one example, each memory location may be tracked with a dirty indicator in the contamination data store. An example contamination data store 390 is shown in FIG. 3. Any type or portion of memory in a computing device may be tracked, e.g., memory pages, individual memory locations in a memory page, CPU registers, and the like.

Each page of memory may be tracked by associating each page of memory with a page dirty indicator. A page of memory may be any segment of memory such as a 4 KB memory segment. The page dirty indicator may indicate whether at least one memory location in the memory page is dirty. If the page dirty indicator indicates at least one dirty memory location within the page, then each memory location in the dirty page may be associated with a memory location dirty indicator. The memory location dirty indicator may indicate whether the associated memory location (as indicated by position in the vector, or in any other suitable manner) is clean or dirty, depending on the information contained at that memory location. In this manner, each memory page may be associated with a page dirty indicator, and only those pages including dirty information may be further segregated into a memory location by memory location tracking of dirty information.

Figure 4:
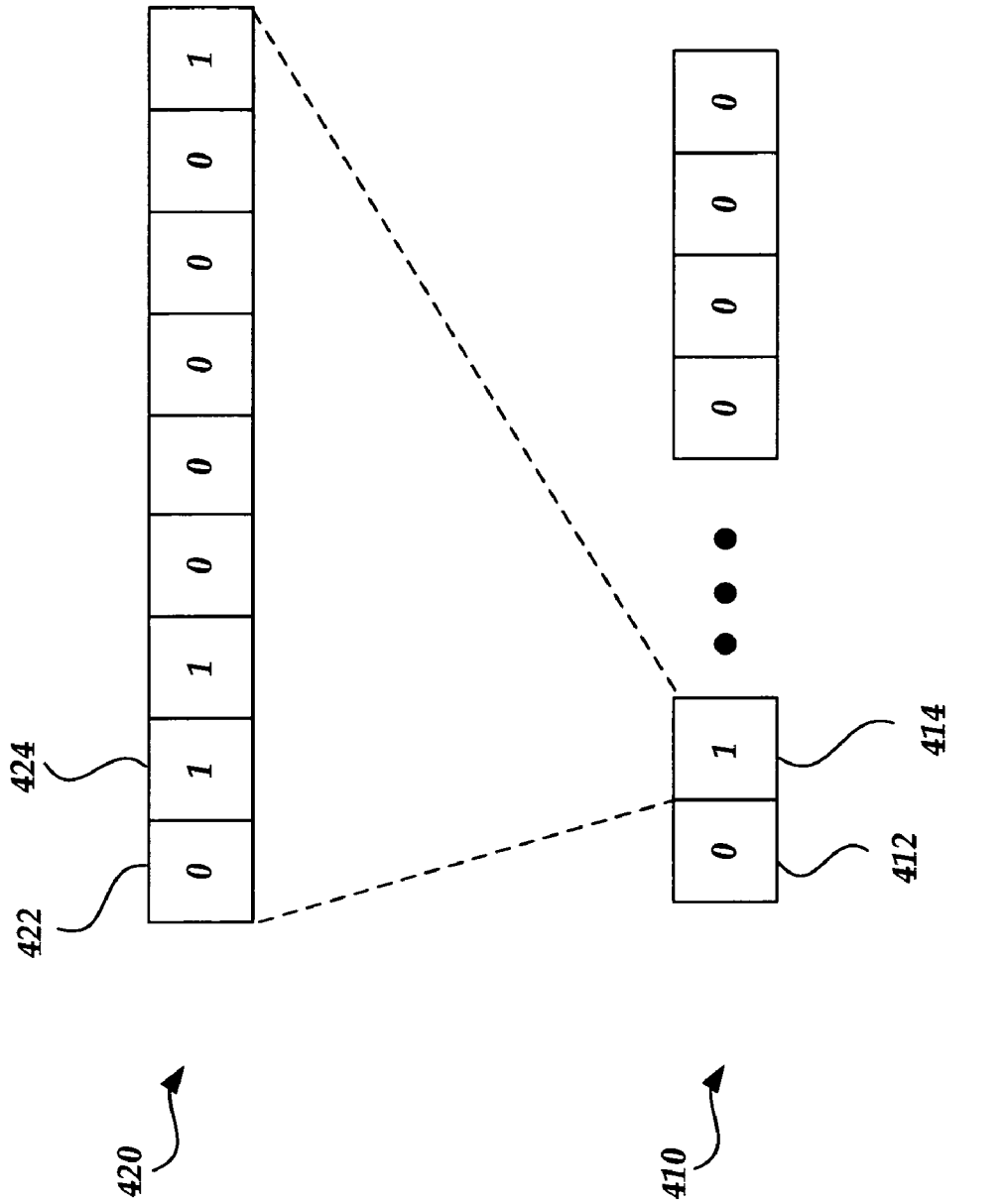
FIG. 4 is a table of an example page contamination data store associated with an example memory location contamination data store.

FIG. 4 illustrates example data structures 410, 420 that allow the detection module to keep track of which memory locations are dirty (e.g., contain data received from input operations). The page contamination data store 410 may include a vector of page dirty indicators which indicate whether the associated memory page is clean or dirty. For example, as shown in FIG. 4, a first memory page may be clean as indicated by the page dirty indicator value 412, and a second memory page may be dirty as indicated by the page dirty indicator value 414. In this manner, the page contamination data store 410 is a vector bitmap with one bit per 4 KB memory page which is set if any location in the page is dirty.

For every dirty page indicated in the page contamination data store 410, an additional memory location contamination data store 420 may be associated with the page dirty indicator of the page contamination data store which indicates a dirty page as shown in FIG. 4. The memory location contamination data store 420 may include a vector of memory location dirty indicators which indicate whether the associated memory location in the dirty page is clean or dirty. For example, as shown in FIG. 4, the second page includes dirty data as indicated by the value of the page dirty indicator 414. The memory location contamination data store 420 may be associated with the page dirty indicator 414. The memory location contamination data store 420 may include a vector of memory location dirty indicators 422, 424 which indicate which memory locations are clean and/or dirty in that particular page. In the example memory location contamination data store shown in FIG. 4, a first memory location may be clean as indicated by the memory location dirty indicator value 422, and a second memory location may be dirty as indicated by the memory location dirty indicator value 424. In this manner, the memory location contamination data store 420 is a vector bitmap with one bit per memory location which is set if the associated memory location on the associated page is dirty. The memory location contamination data store may track dirty memory locations at any suitable granularity, for example, by maintaining a dirty indicator at page, word, and/or byte granularity. Similarly, further memory location contamination data stores may be associated with a memory location dirty indicator indicating a dirty memory location. The further memory location contamination data stores may indicate dirty memory locations at a finer level of granularity, e.g., for each byte of information.

As shown in FIG. 4, the page dirty indicator may be stored in a page contamination data store 410 and the memory location dirty indicator may be stored in a memory location contamination data store 420. Alternatively, rather than a separate data store for each level of memory portion granularity, a single data store may be used with a dirty indicator indicating a dirty memory portion which includes a vector of dirty indicators for the next finer level of granularity. For example, the page dirty indicator may be stored in a contamination data store as an array. The page dirty indicator indicating a clean page may be any suitable indicator such as a 0 or null value. The page dirty indicator indicating a dirty value may be a bit map containing a vector of indicator values which indicate which memory locations of that page are dirty and clean.

Figure 5:
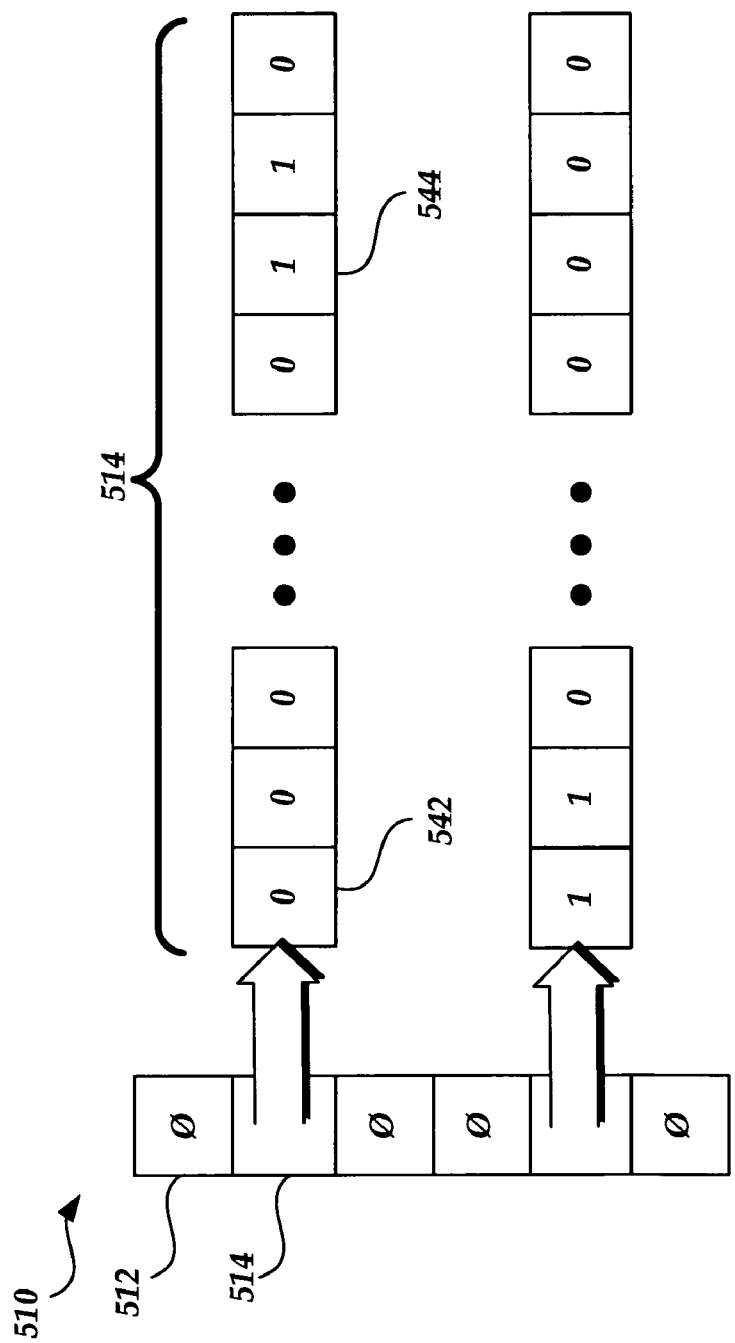
FIG. 5 is a table of another example page contamination data store.

In the example contamination data store 510 shown in FIG. 5, a first memory page may be clean as indicated by the page dirty indicator value 512, and a second memory page may be dirty as indicated by the page dirty indicator value 514. The dirty page indicator which indicates that the page is dirty may include a vector of memory location dirty indicators which indicate whether the associated memory location is clean or dirty. In this manner, the contamination data store 510 is an array bitmap with 1 bit per memory page if the page is clean and is a vector of memory location dirty indicators if the page is dirty. For example, as shown in FIG. 5, the second page includes dirty data as indicated by the value of the page dirty indicator 514. The value of the page dirty indicator 514 may indicate which memory locations within that page are dirty or clean. For example, as shown in FIG. 5, memory location dirty indicator value 542 indicates that the first memory location contains of the page is clean, and memory location dirty indicator 544 indicates that the associated memory location is dirty.

Dynamic data flow analysis may additionally and/or alternatively track data stored in CPU registers as clean/dirty. For example, each register of memory may be tracked with a register dirty indicator in a register contamination data store. The register dirty indicator may indicate whether the associated memory register is clean or dirty depending on the source of the stored information. As noted above, the tracking may also be additionally or alternatively performed at a smaller granularity than a register, for example, by keeping a dirty indicator for each byte in a register.

Figure 14:
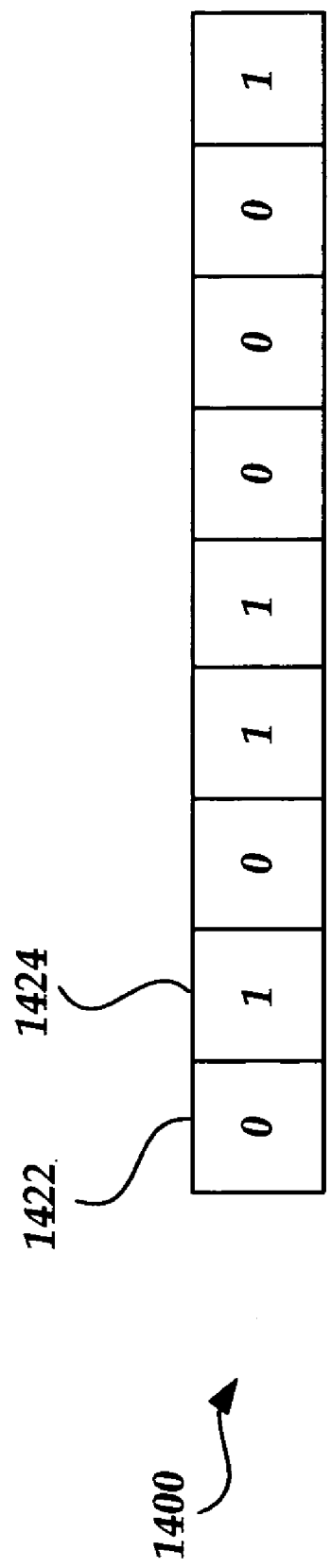
FIG. 14 is a table of an example register contamination data store.

FIG. 14 illustrates an example data store 1400 that allows the detection module to keep track of which registers are dirty (e.g., contain data received from (or derived from) input operations). The register contamination data store 1400 may include a vector of register dirty indicators. For example, as shown in FIG. 14, a first CPU register may be clean as indicated by the register dirty indicator value 1422, and a second CPU register may be dirty as indicated by the register dirty indicator value 1424. In this manner, the register contamination data store 1400 is a vector bitmap with one bit per CPU register which is set if the associated CPU register on the associated page is dirty.

Although examples of memory pages, memory locations, and registers are described above, it is to be appreciated that any type, portion, and/or format of memory may be tracked using dynamic data flow analysis as described above.

As noted above, the dirty indicator may not only indicate that the associated memory portion is clean/dirty, but may also indicate a source and/or derivation path of the information stored in the memory portion. The source, calculation, or derivation of the information stored in a dirty memory portion may be indicated in any suitable manner, such as an input message identifier with an optional offset indication, a data flow graph that includes the sequence of instructions used to compute the value at the dirty memory location, and the like. The dirty indicator may also indicate the original source of the values manipulated in the instructions.

Figure 18:
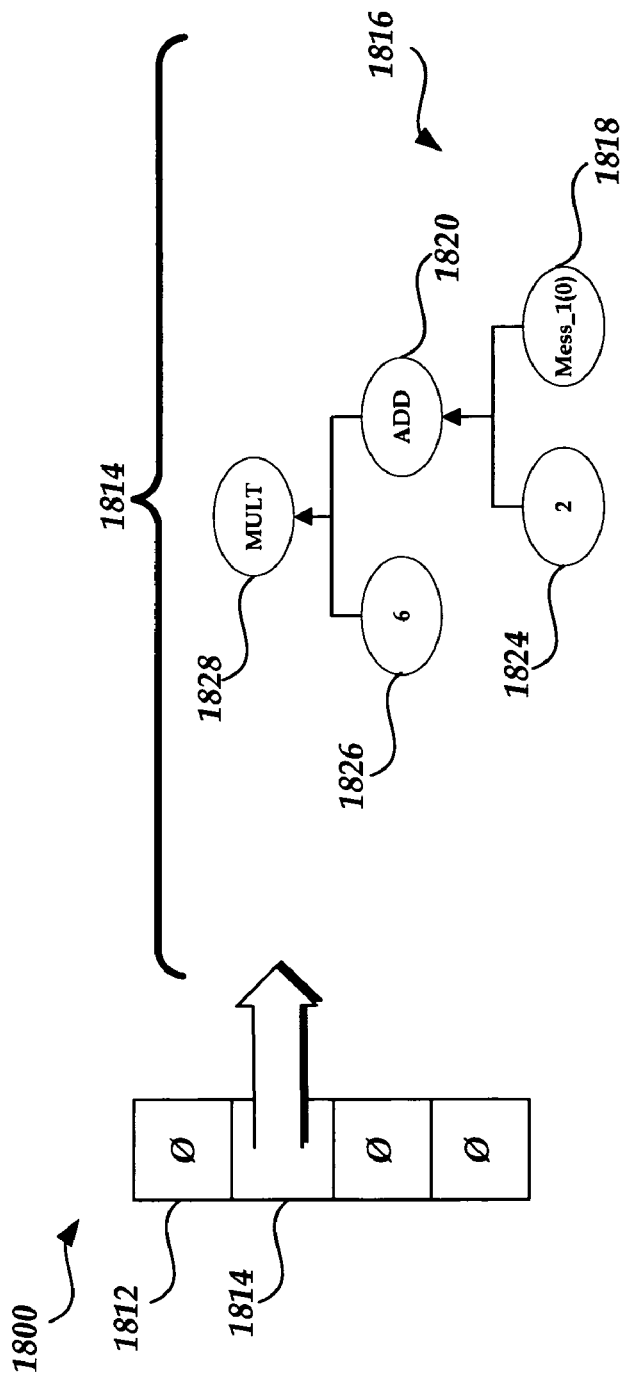
FIG. 18 is a table of an example contamination data store.

FIG. 18 illustrates an example contamination data store 1800 that allows the detection module to keep track of which memory locations and/or registers are dirty (e.g., contain data received or derived from input operations) and the source of the dirty data. As shown in FIG. 18, the dirty indicator, such as dirty indicator value 1812 may indicate that the associated data in that location is clean in any suitable manner, such as a null value, and the like. The dirty indicator value 1814 may indicate that the associated data stored at the correlated location is dirty, and may indicate the source of the dirty information. For example, as shown in FIG. 18, the dirty indicator value 1814 may include a dataflow diagram indicating that the data stored in the associated memory location is derived from dirty input data from an untrusted source, and indicating how the data stored in the associated memory portion is derived from dirty input data. The dataflow graph may indicate the input value, the source message of the input data, the offset within the message of the input data, the instructions applied to the input data to derive the present stored data, and the like. As shown in FIG. 18, the dirty indicator value 1814 may indicate a dataflow graph 1816. The dataflow graph 1816 of FIG. 18 indicates that the input data 1818 has an offset of 0 in a message having a message identifier of mess__1. The dataflow graph may indicate the operations and/or instructions applied to the input data. As shown in FIG. 18, the addition operation 1820 is executed using the input value 1818 and a value 1824, which is illustrated as a value of 2. The result of the addition operation may be multiplied with the value 1828 by the multiply operator 1826. In this manner, the dataflow graph illustrates how the associated memory location is derived from dirty data, e.g., input data 1818.

The contamination data store(s), storing the dirty indicator(s), such as page contamination data store 410 and register contamination data store 420 of FIG. 4, contamination data store 510 of FIG. 5, register contamination data store 1400 of FIG. 14, and contamination data store 1800 of FIG. 18, may be stored in any one or more suitable data stores in the memory of a computing device. It is to be appreciated that any suitable data store in any suitable format may be used to store and/or communicate the contamination data store information to the detection module, including a relational database, object-oriented database, unstructured database, an in-memory database, sequential memory, or other data store. A storage array may be constructed using a flat file system such as ASCII text, a binary file, data transmitted across a communication network, or any other file system. Notwithstanding these possible implementations of the foregoing data stores, the term data store and storage array as used herein refer to any data that is collected and stored in any manner accessible by a computer.

The dirty indicators for a register, page, memory location, and the like may be generated at any suitable time. For example, whenever an input operation is performed (e.g. receiving and/or manipulating data from a network connection), the memory locations and/or registers where the resulting data is written may be indicated with a dirty indicator. With reference to FIG. 3, the detection module 340 may generate one or more dirty indicators for associated portions of memory whenever an instruction of the form [MoveData destination,source] is executed. More particularly, every time that data from a dirty source is written to a destination, the destination memory portion, e.g., memory location, register, and the like, may be indicated as dirty, otherwise, the destination memory portion may be indicated as clean. When instructions or system calls write data from an untrusted outside source to a destination, the destination memory portion may be indicated as dirty. The instruction MoveData is a generalized instruction that is not present in any specific CPU, and may include any number and/or combination of instructions which may manipulate data within the memory of a computing device. For example, the MoveData instruction may include an x86 MOV instruction where operands are registers or memory, a PUSH operation where the destination is the memory location pointed to by the ESP register and another register is the operand. Other examples may include load and store operations such as MOV, MOVS, PUSH, POP, and the like. Other examples may include arithmetic and logic instructions such as ADD, MUL, AND, XOR, and the like. Whenever a memory location becomes dirty because an arithmetic or logic instruction is executed, the dirty indicator may include the full or partial sequence of instructions that caused the memory location to become dirty. Although the above examples are specific to an x86 CPU, those of skill in the art will recognize that other operations and/or instructions performed by other computing devices may be appropriate.

To detect the presence of a worm using dynamic data flow analysis, the data may be examined before it is executed and/or loaded into an instruction pointer. In this manner, dynamic data flow analysis may intercept execution before the worm takes control. Specifically, detection may occur when execution control is being re-directed to an illegal location. For example, before an instruction is executed, the appropriate contamination data store may be examined to ensure that the associated dirty indicator(s) for the memory portion that stores the data to be executed is clean. If the dirty indicator indicates that the memory location that stores the data is dirty, the execution of the instruction may be aborted, and the presence of a worm may be detected. Similarly, before data is loaded from a portion of memory into the instruction pointer, the associated contamination data store for that memory portion of the data may be examined. If the dirty indicator for the associated memory portion indicates that the data came from or is derived from an untrusted source, then the pointer value may not be loaded into the instruction pointer and the presence of a worm may be detected. To reduce any false positives that this last test may generate, the detection module may further verify that no range comparisons (for example checking if a value is smaller than a given constant) or logic operations (for example an AND with a given bit pattern) were computed on the value about to be loaded into the instruction pointer. The detector module may also use the vulnerability verification procedure described below to guarantee that the presence of a worm is correctly detected, without false positives.

Dynamic data flow analysis detection is very general, since it may protect against unknown attack targets while most of the currently available tools are designed to protect known targets. A detection module implementing dynamic data flow analysis as described above may not rely on detecting overwriting of any particular data structure, but rather may track the source of the data being executed or loaded into the instruction pointer. For instance, several tools are designed to protect the stack, however an attacker may choose to target a function pointer or setjmp buffer to bypass that type of protection. In either case, the attacker will have to input some data into the running program which means dynamic dataflow analysis may detect the attack. In fact, dynamic dataflow analysis may be able to detect problems where attack targets are very hard to identify.

For example, a program, such as the source code listing 1700 illustrated in FIG. 17, may load data from a network connection, and copy that data into a second buffer. The program may change the page protection permissions on the page which contains the buffer to allow execution and then jump into the buffer. This problem would be undetected by tools that protect the stack or any other program data structure, since no damage is done to the program's stack and there are no buffer overruns. The problem would also not be detected if the program were run in a CPU that enforces execute permissions on pages, since the program explicitly changes page permissions. However, dynamic dataflow analysis as described above may detect the problem, since the data in the buffer originally entered the program's address space through an input operation on a network connection.

Although the example is slightly contrived, it shows the kind of arbitrary error that programs may contain.

It is to be appreciated that in some cases, the dynamic flow analysis implemented by a detection module may not require access to source code, while most protection tools do. This detection mechanism can be implemented in several other ways. It may be implemented by running programs in a CPU emulator under interpretation by tracking memory accesses using page permissions, by using binary instrumentation techniques, or by controlling the execution of a program using operating system debugging interfaces. Moreover, in some cases, as long as the execution environment is able to retain control on every executed instruction, dynamic dataflow analysis as described above may detect security problems even in self-modifying code and dynamically generated code (e.g., code generated in just-in-time compilation environments, and the like). If programs are run in an interpretation environment, maintaining control on every instruction is trivial, but binary re-writers that support self-modifying code also exist.

Since dynamic flow analysis does not depend on known vulnerabilities of a system, and/or defining characteristics of a message including a worm, the above described dynamic flow analysis may detect worms that are known and/or unknown. In addition, a detection module implementing dynamic flow analysis may detect slow-speed worms and/or worms that are disguised as normal traffic. Even if worms piggyback themselves only on normal application traffic, the detection module using dynamic flow analysis may detect the worm. In addition, a detection module implementing dynamic flow analysis may detect polymorphic and/or metamorphic worms. Worm mutation engines that use general obfuscation techniques, including encryption, are widely available. Therefore, future worms may use these tools extensively, increasing the difficulty of detection without dynamic flow analysis.

A detection module implementing dynamic data flow analysis may be extended to detect worms which gain control of the target program by overwriting system calls parameters. Such worms may, for instance, overwrite the parameters of a system call that creates a process and launches a program that accepts commands from other worm instances. The detection module may detect such attacks by checking that system calls are using dirty arguments, e.g., arguments stored at dirty memory locations, and that those arguments were not checked by the system, i.e., the logic operations (e.g., comparison with specific values or ranges of values) computed on the dirty arguments are not sufficient to restrict them to safe values. For example, the detection module may conclude that the worm may force the target program to launch any program stored on the target system.

The detection module may implement more than one detection mechanism and each detection module of one or more different nodes in a network may implement different detection techniques. For example, the detection module may implement the data flow analysis detection mechanism described above in conjunction with one or more other detection mechanisms. There may also be multiple implementations of each detection mechanism. In this manner, diversity in both type and implementation of detection mechanisms may be achieved. Example additional and/or alternative detection mechanisms may include detection mechanisms which are less general than dynamic dataflow analysis but are still able to detect significant attacks.

One such simple technique is to detect that every RET instruction transfers control into an executable page. This detection mechanism may be effective, since many worms use the simple technique of overwriting the stack and jumping into the data that overwrote the stack, which usually is not in a region of memory with execute permissions. This technique may be implemented by instrumenting every RET instruction on the target executable, using binary re-writing. Many other techniques can be used to protect the stack.

Another example additional and/or alternative detection mechanism may keep a shadow stack by instrumenting every CALL and/or RET instruction. The shadow stack is basically a copy of the normal stack, but kept in a different memory location, so that the stack's integrity may be checked at every RET.

It is to be appreciated that other additional and/or alternative detection mechanisms may be implemented by a detection module to detect the presence or danger of worms, viruses, and the like, including identifying received information as containing known worms; comparing received information with stored information to detect the presence of altered and unwanted files, detect changes in configuration, and/or verify a parameter value such as a return address; comparing the information expected to be stored with the information actually stored to detect buffer overwrites; detecting buffer overflow with a guard storage segment; implementing array bounds checking to directly detect buffer overflows and underflows; monitoring the run-time of a program and/or communication patterns and detecting any deviation from expected behavior; examining incoming data for a known worm signature such as string and/or message length; dynamic data flow analysis; and the like.

Figure 6:
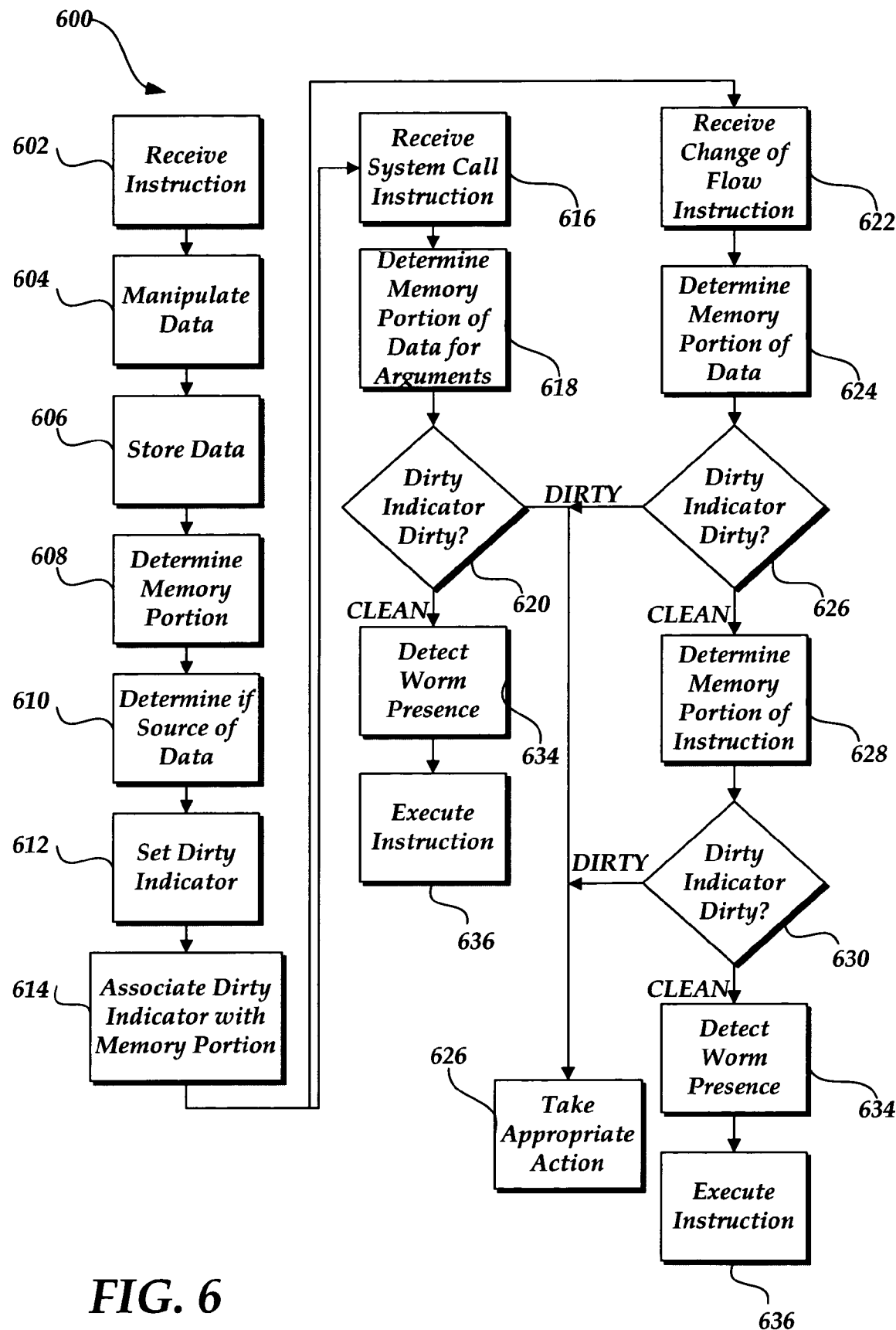
FIG. 6 is a flow chart of an example method of detecting a worm attack and/or program vulnerability.

In operation, a detection module, such as the detection module 340 of FIG. 3, may implement a method of detecting a worm. FIG. 6 illustrates an example method 600 of detecting a worm. An instruction to manipulate data may be received 602, such as by a computing device described with reference to FIG. 1. As noted above, the instruction to manipulate data may be any instruction which moves, combines, transfers, loads data and the like. The data may be manipulated 604 as instructed, such as by the appropriate local application, operating system, and the like of the computing device. Manipulation of the data may include storing 606 at least a portion of the data, or a manipulated portion of the data (e.g. a derivative of the data) at a memory location and/or register. The memory may be part of the stack, buffer, or any other portion of the memory of the computing device. The location of the stored data may be determined 608 in any suitable manner. The source of the data may be examined to determine 610 if the memory portion storing the information is 'dirty' or 'clean.' A memory portion is dirty when the stored information is derived from an untrusted source. Likewise, data may be considered clean if the data comes from a trusted source and/or is derived from other clean data.

If the data is clean, then a dirty indicator value may be set 612 to indicate that the data is clean. As noted above, the dirty indicator indicating clean data may be any suitable indicator, including a value of '0', a null value, and the like.

The determined dirty indicator value may be associated 614 with the memory portion of the stored data, such as by storing the dirty indicator value in a contamination data store, such as contamination data store 390 of FIG. 3. The contamination data store may be initialized and/or populated with a default dirty indicator value. More particularly, all memory portions may be initially considered and/or associated with a dirty indicator indicating dirty memory portions unless purposely changed to clean if clean data is positively determined and stored in the associated memory portion. In another example, all memory portions may be initially considered and/or associated with a dirty indicator indicating clean unless purposely changed to dirty if dirty data is positively determined and stored in the associated memory portion. It is to be appreciated that the contamination data store may be initialized to any appropriate value. Moreover, as noted above, the contamination data store may include one or more data stores, with one or more dirty indicators associated with each memory register, memory page, memory location, and the like.

If the data is dirty, then a dirty indicator value may be set 612 to indicate that the data at the determined location is dirty. As noted above, the dirty indicator indicating dirty data may be any suitable indicator, including a value of '1' or a unique origin identifier, e.g., message identifier, associated with the source of the data, a, memory location for the data providing input to the present data being stored, a message identifier combined with an offset inside the message, data flow graph including all or a portion of the instructions used in computing the stored data, and the like. If the stored data is derived from other 'parent' data which is stored at another dirty memory portion, the same origin indicator as the 'parent' data, a memory location of the parent data, a data flow graph created by combining the received instruction with the data flow graph of the instructions' operands, and the like. The determined dirty indicator value may be associated 614 with the memory portion (e.g., location or register) of the stored data, such as by storing the dirty indicator value in an appropriate contamination data store. For example, if a memory location is determined to be dirty, then a memory location dirty indicator may be set to indicate dirty data, and/or a page dirty indicator may be set to indicate a dirty page of memory.

In some cases, to detect the presence of a worm exploiting a system call argument, the method may determine when dirty memory portions are used as arguments to system calls. More particularly, an instruction to perform a system call may be received 616. The memory portion of the data to be passed as arguments of the system call may be determined 618. The dirty indicator associated with the determined memory portion(s) may be examined 620. For example, as noted above, a dirty indicator may be associated with each memory portion to indicate if the stored information is clean or dirty. If the dirty indicator indicates that the data to be loaded passed as arguments of the system call is 'clean', then, in some cases, the received instruction may be executed 636, e.g., the system call may be executed. In some cases, to include a variety of detection mechanisms, the instruction and/or data may be further examined using other detection techniques to detect 634 the presence of a worm, virus, and the like.

In some cases, to detect the presence of a worm, the method may determine when data stored at a dirty memory portion is manipulated in a manner that indicates the presence of a worm. More particularly, an instruction to change the execution flow may be received 622. The memory portion storing of the value to be loaded into the instruction pointer may be determined 624. The dirty indicator associated with the determined memory portion(s) may be examined 626. If the dirty indicator indicates that the memory portion storing the value to be loaded into the instruction pointer is dirty, then appropriate action may be taken 626 as noted above. If the dirty indicator indicates that the memory portion storing the value to be loaded is 'clean', then, in some cases, the received instruction may be executed 636, and the value loaded. In some cases, if the memory portion of the value to be loaded is indicated as clean, the location of the instruction indicated by the loaded value may be determined 628 and examined 630 to determine if the memory portion storing the instruction is clean or dirty. If the location storing the instruction is dirty, appropriate action may be taken 626. If the location is indicated as clean, the instruction and/or data may be further examined using other detection techniques to detect 634 the presence of a worm, virus, and the like. If the dirty indicator indicates that the storage locations of the value to be loaded and the instruction indicated by the value are clean, then the instruction may be executed 636.

If the dirty indicator indicates that the data to be manipulated is 'dirty,' then appropriate action may be taken 626. As noted above, the appropriate action in response to detection of a worm may include shutting down the vulnerable program, shutting down the host system, generating and sending an alert message, generating a patch and/or a filter for the vulnerability, and the like.

Self-Certifying Alerts ("SCA")

In some cases, a single node may include a detection module to protect itself. However, detection of worms may be a computationally intensive process. Accordingly, in some cases, one or more nodes of a network, such as the network illustrated in FIG. 2, may detect worms, vulnerabilities, and/or attacks, and may alert one or more nodes in the network. If a central node detects worms on behalf of many other nodes, the detection system may be server centric. In this manner, the load of detecting worms may be carried by a dedicated system. Alternatively, all or a subset of the nodes in the network may be responsible for detecting vulnerabilities, then the detection system may be host-centric. The set of nodes in the network detecting vulnerabilities may be fixed or may change over time and may join and leave at any time. A combination of server and host centric detection systems may implement various detection systems among various nodes of a network and communicate detection results to each other and/or other nodes in the network.

Whenever a detection mechanism detects a worm attack, an alert identifying the vulnerability of a software program and/or characteristics of the identified worm (e.g., message source, and the like) may be generated. For example, the alert may identify the worm through its characteristics as incoming data (worm-centric) and/or through a vulnerability of a software application which may be exploited by the worm (vulnerability centric). The generation of an alert may be automatic or manual, and may be in response to a detected vulnerability and/or worm. An alert may be generated in any suitable manner such as through an alert module 350 in response to input from the detection module 340, as shown in FIG. 3.

In some cases, the alert may be generated such that a receiving system may certify the authenticity of the origination and/or content of the alert message. To certify origination of the alert, the alert may or may not be digitally signed identifying the alert as coming from a trusted source. To certify the vulnerability of a program indicated in the alert, the alert may contain a list of events and/or program path describing how to trigger the vulnerability, and the like. In one example, the self-certifying alert may include a machine verifiable proof which identifies and/or describes a software vulnerability. In this manner, the self-certifying alert may include information which allows recipients to efficiently and/or effectively check the authenticity of the vulnerability claim in an alert by reproducing the infection process. The self-certifying alert may describe the vulnerability in the software system in any suitable way such as through a textual description, a complete and/or partial log of non-deterministic events which illustrate the vulnerability, inclusion of proof carrying code described by Necula et al., "Safe Kernel Extensions without Runtime Checking," $2^{nd}$ Symp. On Operation System Design and Implementation, October 1996, pp. 229-243, which is incorporated herein by reference, and the like.

For example, a log of non-deterministic events may include the received data and may illustrate the events up to the instant of detected attack, e.g., execution of data stored in a dirty memory portion and/or loading the program counter with data from a dirty memory portion.

The description of the software vulnerability may be used to self-certify the alert since the receiving computing device may verify that the identified software application responds in the indicated manner, which indicates a software vulnerability to worm attack. In this manner, the alert may be self-certified since the alert may be certified based on information included in the alert and information known to the receiving node (e.g., through verification of a response of a local application). In this manner, the self-certifying alert may be vulnerability centric, rather than worm centric.

The detected vulnerability of a program may be described in the self-certifying alert as a list of non-deterministic events. More particularly, the execution of the vulnerable program may be modeled as a piecewise deterministic process. The execution is a sequence of intervals, each interval starting with a non-deterministic event (e.g. the reception of a message), and followed by a sequence of deterministic events. Execution within an interval is deterministic, e.g., the response of the program completely determined by the current state. In this manner, recording all non-deterministic events may enable a replay of the execution, which may illustrate a vulnerability of the program. Replaying the execution that exhibits the vulnerable behavior of the identified program may allow the node to check the authenticity of the self-certifying alert.

Figure 7:
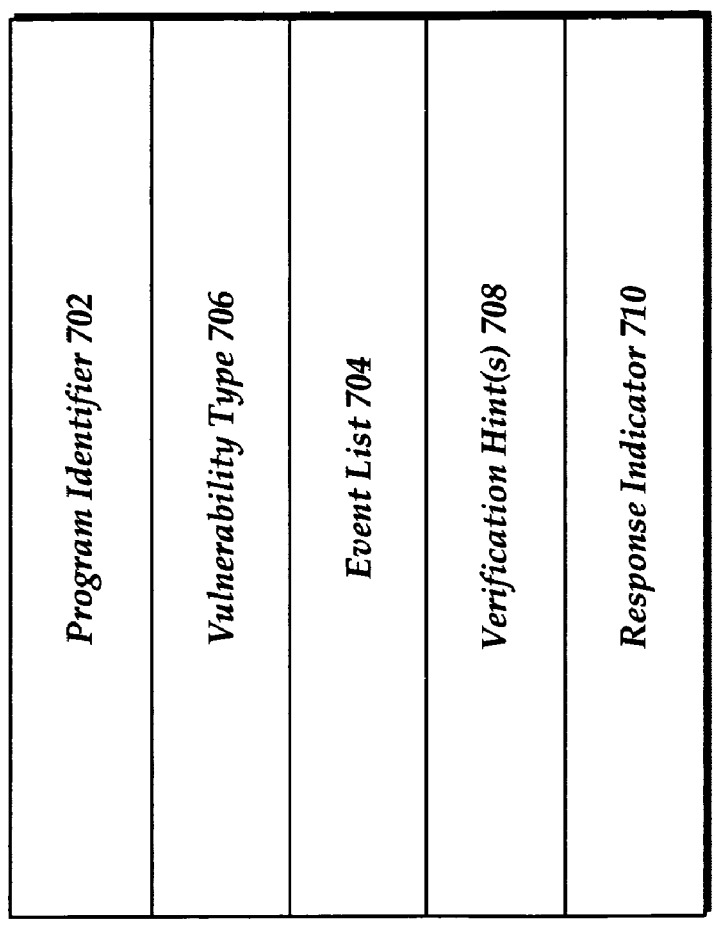
FIG. 7 is a schematic diagram of an example alert.

FIG. 7 illustrates an example self-certifying alert 700 which is vulnerability centric. The self-certifying alert may be in any suitable format and/or in accordance with any suitable message protocol. The self certifying alert may include a program identifier 702 and an event list 704, and may optionally include a vulnerability type identifier 706, one or more verification hints 708, and/or a response indicator 710.

The program identifier 702 may identify the program or application with the detected vulnerability. The program identifier 702 may include any one or more of any suitable identifier of the vulnerable program such as a commercial name, predetermined name, version number, a manufacturer name, and the like.

The event list 704 is a sequence of one or more non-deterministic events that when executed would cause the program to reach a disallowed state. Replaying the event list may illustrate and/or indicate the detected vulnerability of the program. The sequence of events in the event list 702 may be generated in any suitable manner. Techniques to log non-deterministic events are described further in the fault tolerance literature including those described by Dunlap et al., "Revirt: enabling intrusion analysis through virtual-machine logging and replay," Operating Syst. Design and Implementation, Boston, Mass., December 2002, and Elnozahy et al., "A survey of rollback-recovery protocols in message passing systems," ACM Computing Surveys, vol. 32, no. 3, September 2002, pp. 375-408, both of which are incorporated herein by reference.

The sequence of events may include or be derived from those events logged during the detection process, such as those events logged during the dynamic flow detection technique discussed above. The sequence of events in the event list may or may not match the events actually logged during the attack, such as events logged by the detection module 340 of FIG. 3. The node which prepares the self-certifying alert may modify logged events in any suitable manner, including removing events which are not necessary to reach the disallowed state, replacing portions of the worm code with innocuous values, and the like. The sequence of non-deterministic events in the event list 702 may take any suitable format and/or contain any suitable instructions or other data. For example, the event list may include a list of results from operating system calls and/or a list of received messages. Since worms may exploit vulnerabilities that to do not require a long interaction with the vulnerable program, the sequence of non-deterministic events may be fairly short. More particularly, the vulnerable behavior may be triggered with a small amount of data. For example, for many previous worms, a single receive event may be sufficient.

For detection of worms using dynamic flow analysis, the detection module 340 intercepts execution before the worm takes control. Specifically, detection of the worm attack may happen when execution control is being redirected to an illegal location, e.g., data is about to be executed or loaded into the instruction pointer from a dirty memory portion. To limit the size of the event list in an alert, the log of non-deterministic events may be searched for the event that contains the data stored in a dirty memory portion that would have been executed or loaded into the program counter, if detection had not intervened. In many cases, the vulnerability may be triggered by a single event and the self-certifying alert may include only the event that is the result of this search. In one example, a search for the dirty data, e.g., illegal address, over the complete log may be conducted. In another example, the data flow analysis described above with reference to a detection mechanism of the detection module may be used to avoid the search and reduce occurrence of false matches. Since the dynamic flow analysis may provide full data flow tracking from all the input events, the exact input event or events that determine the value of the dirty data that was about to be executed or loaded into the program counter may be determined. For example, data flow tracking may identify the particular message from an external source introducing the information used in the worm attack, the input event(s) which may exploit the vulnerability, and/or the offset of the data and/or instruction within the input data.

To determine the input event, an input event identifier may be associated with data stored in a dirty memory portion to indicate the input event that determines the current value of the dirty data. The input event identifier may be in addition to and/or comprised in the dirty indicator. The input event identifier may be any suitable identifier which identifies the input event loading the data from a dirty memory portion and/or the source of the dirty data, such as an integer, text string, and the like. In one example, the dirty indicator includes the input event identifier which identifies the source of the dirty data. More particularly, a dirty indicator indicating clean may be any suitable value such as null or 0. However, in some cases, rather than having an integer such as a '1' indicate a dirty memory portion, the dirty indicator indicating a dirty memory portion may be an input event indicator or other source indicator. Alternatively, the dirty indicator may include a data flow graph, such as that shown in FIG. 18, to determine the input events or byte ranges in these events that determine the current value stored in a dirty memory portion. When dataflow analysis signals a vulnerability, the events with identifiers in the data flow graph of the dirty data about to be executed or loaded into the program counter and the last non-deterministic event in the execution log may be used to form the event list in the alert.

In addition or as an alternative to reduce the size of the sequence of non-deterministic events needed to replay the vulnerable execution, the execution may be replayed during the alert event list generation with an increasingly larger suffix of the event log (e.g., moving backwards through the log) and each iteration may be checked for the presence of the error condition. In this manner, the list of events may be reduced from the original events leading to detection of the vulnerability. For most current worms this strategy may be effective since the last few packets received over a network connection may trigger the vulnerability.

The vulnerability type identifier 706 may identify and/or describe the type of program vulnerability or error condition which exists and may be exploited in the indicated program. The vulnerability type identifier may be any suitable identifier such as an alpha-numeric text string, and the like, which indicates a predetermined vulnerability of the indicated program that allows an unacceptable error condition. The description and/or acceptability of the error condition may be agreed upon and predetermined among generators and receivers of alerts. Moreover, receiving nodes of the self-certifying alert may agree which conditions or results of execution is the expression of a vulnerability. The agreement as to the type of vulnerability may be a priori, e.g., predetermined, or dynamic, e.g., determined at the time of worm detection and/or alert reception. The types of vulnerabilities identified by the vulnerability type identifier may be any suitable vulnerability of a program or application. There may be many different types of conditions that can, a priori, be agreed upon as expressions of vulnerability. One example of a vulnerability type may be an arbitrary execution control ("AEC"). AEC alerts identify vulnerabilities that allow worms to redirect execution to arbitrary pieces of code in a program's address space. They describe how to invoke a piece of code whose address is supplied in an input to the vulnerable program. Another example of a vulnerability type may be Arbitrary Code Execution (ACE). ACE alerts describe code-injection vulnerabilities. They describe how to execute an arbitrary piece of code that is supplied in an input to the vulnerable program. Another example of a vulnerability type may be Arbitrary Function Argument (AFA). AFA alerts identify data-injection vulnerabilities that allow worms to change the value of arguments to critical functions, for example, to change the name of the executable to run in an invocation of a system call that creates processes. They describe how to invoke a specified critical function with an argument value that is supplied in an input to the vulnerable program.

The verification hint(s) 708 may include any suitable information that may facilitate checking that the indicated condition or vulnerability is true after replaying the indicated list of events.

The response indicator 710 may include any suitable information that may facilitate an appropriate response to the program vulnerability. For example, the response indicator may indicate that a patch may resolve the vulnerability, a filter may be generated to detect potential exploitation of the vulnerability, a filter for detecting reception of a message containing an identified worm, actual code implementing a patch/ filter, and the like.

In one example, a vulnerability centric self-certifying alert may indicate that a program has an arbitrary execution control (AEC) vulnerability. Since worm attacks may be based on the ability to arbitrarily change the flow of execution of a vulnerable program, the vulnerability may be indicated with an AEC vulnerability type indicator. Since providing the ability to redirect the program counter to arbitrary locations by sending messages to a program is rare and dangerous, hosts may agree that this condition expresses a vulnerability. For this type of vulnerability, the verification hints may specify that the program counter (for example, EIP on x86 CPUs) will be loaded with an arbitrary value, and may specify where in the list of non-deterministic events is the value that will be loaded into the program counter. For instance, if the list of non-deterministic events is a list of received messages, the verification hints may specify in which message and at which offset is the value that will be loaded into the program counter. The message and offset may be determined using the techniques discussed above.

In another example, a vulnerability centric self-certifying alert may indicate that a program has an arbitrary code execution (ACE) vulnerability. Since worm attacks may be based on the ability to inject code into a vulnerable program, the vulnerability may be indicated with an ACE vulnerability type indicator. Since providing the ability to inject new code into a program by sending messages to a program is rare and dangerous, hosts may agree that this condition expresses a vulnerability. For this type of vulnerability, the verification hints may specify that the new code will be injected and executed, and may specify where in the list of non-deterministic events is the code that will be executed. For instance, if the list of non-deterministic events is a list of received messages, the verification hints may specify in which message and at which offset is the code that will be injected and executed. The message and offset may be determined using the techniques discussed above.

In another example, a vulnerability centric self-certifying alert may indicate that a program has an arbitrary function argument (AFA) vulnerability. Since worm attacks may be based on the ability to inject a value to be used as a function argument, the vulnerability may be indicated with an AFA vulnerability type indicator. Since providing the ability to inject arbitrary new arguments to system calls used by a program by sending messages to a program is rare and dangerous, hosts may agree that this condition expresses a vulnerability. For this type of vulnerability, the verification hints may specify that an arbitrary function argument be injected and executed, and may specify where in the list of non-deterministic events is the argument that will be injected. For instance, if the list of non-deterministic events is a list of received messages, the verification hints may specify in which message and at which offset is the argument that will be injected. The message and offset may be determined using the techniques discussed above.

An alternative form of self-certifying alert may include a proof that the program is vulnerable similar to the proof-carrying code of Necula et al., "Safe Kernel Extensions without Runtime Checking," $2^{nd}$ Symp. On Operation Systems Design and Implementation, Oct. 1996, pp. 229-243. In the simplest form, this proof may include a description of the execution path that leads to a disallowed state, such as in the form of a sequence of instructions. This form of alert is different from the previous ones because it carries sequences of program instructions, instead of having only lists of non-deterministic events, and it may also carry logic formulas to facilitate the verification mechanisms described below.

The node generating the alert may send the alert to at least one other node to inform it of the detected worm or vulnerability. Distribution of the alert may be determined through a distribution module 370 in response to the alert module 350, as shown in FIG. 3. The node may send the alert over communication media in any suitable message format or protocol. The alert may be distributed to any suitable nodes in communication with the node generating the alert. When a node receives an alert, the node may also distribute the alert to any suitable nodes in communication with it. For example, the alert may be sent to all nodes in accordance with a predetermined alert list of addresses, to all nodes in recent contact with the generating node, or in accordance with any other suitable distribution scheme. One distribution scheme is discussed in further detail below.

Certifying the Self-Certifying Alert

The self-certifying alert such as self-certifying alert 700 of FIG. 7, may be self-certified by a node which receives the alert. For example, an alert verification module 360 of a receiving node 320, as shown in FIG. 3, may certify the received alert 330. In one example, the receiving node may parse the alert to retrieve the program identifier and event list and any other parameters such as a vulnerability indicator and one or more verification hints. The receiving node may replay the execution defined by the event list in the indicated program. Any suitable technique may be used to replay the event list, including replaying the events in the program in some type of sandbox environment. The results of replaying of the event list may be examined by the receiving node to verify a program vulnerability, that may be augmented with the provided vulnerability type identifier and/or verification hint(s) to determine if the indicated error or vulnerability condition exists. If not, the alert is not certified and appropriate action may be taken, such as dropping the message, sending an alert identifying the false alert to other nodes, and the like.

Rather than literally executing the event list, the event list may be certified using first-order logic. For example, a proof included in the self-certifying alert may be verified in a manner similar to the mechanics of proof-carrying code. However, rather than showing that all executions of the program respect a safety condition, certifying a self-certifying alert may show that one particular execution of the program exhibits a vulnerability. Rather than considering the complete program, certification of a self-certifying alert may focus on one or more identified execution paths, e.g., the one defined by the sequence of non-deterministic events in the event list. In a simple form, the proof in a self-certifying alert may include the list of instruction executed in the path defined by the list of events. In this manner, a logical verification may generate a safety condition for the identified paths in the vulnerable program and show that the safety condition does not hold when the program receives the events in the event list provided by the self-certifying alert.

For example, in the AEC self-certifying alert discussed above, the vulnerable execution path of the indicated program may be triggered by reception of a single message and the self-certifying alert may include the list of instructions in the path. To certify the alert, the list of instructions may be checked, such as by using the program text to determine a safety condition and to verify that the event in the event list violates this condition. A logic safety condition may be generated from the program's instructions for that execution path. To obtain a safety condition for an execution path, an abstract machine may be defined that simulates the execution of safe programs. The instructions for the abstract machine may be similar to the instructions for a real CPU generated by the vulnerable program.

FIG. 9 illustrates an example abstract machine 900 for a subset of x86 CPU instructions. In FIG. 9, $\pi$ indicates a vector of CPU instructions (e.g., the list of instructions in the self-certifying alert); pc indicates the program counter; $\pi_{pc}$ indicates the current instruction; $\rho$ indicates the state of machine registers and memory; $\rho[r_i]$ is the value of register $r_i$ in state $\rho$ (and may be abbreviated as $r_i$); $r_m$ indicates a special register that denotes the state of memory; $\rho[r_d \leftarrow r_s]$ indicates a new state obtained from $\rho$ by replacing the value of $r_d$ by the value of $r_s$; $sel(r_m,n)$ indicates the contents of memory address n;  $upd(r_m,r_d,r_s)$ indicates a new memory state resulting from writing register $r_s$ to register $r_d$; and ZF indicates a zero flag (e.g., one bit of memory).

Figure 10:
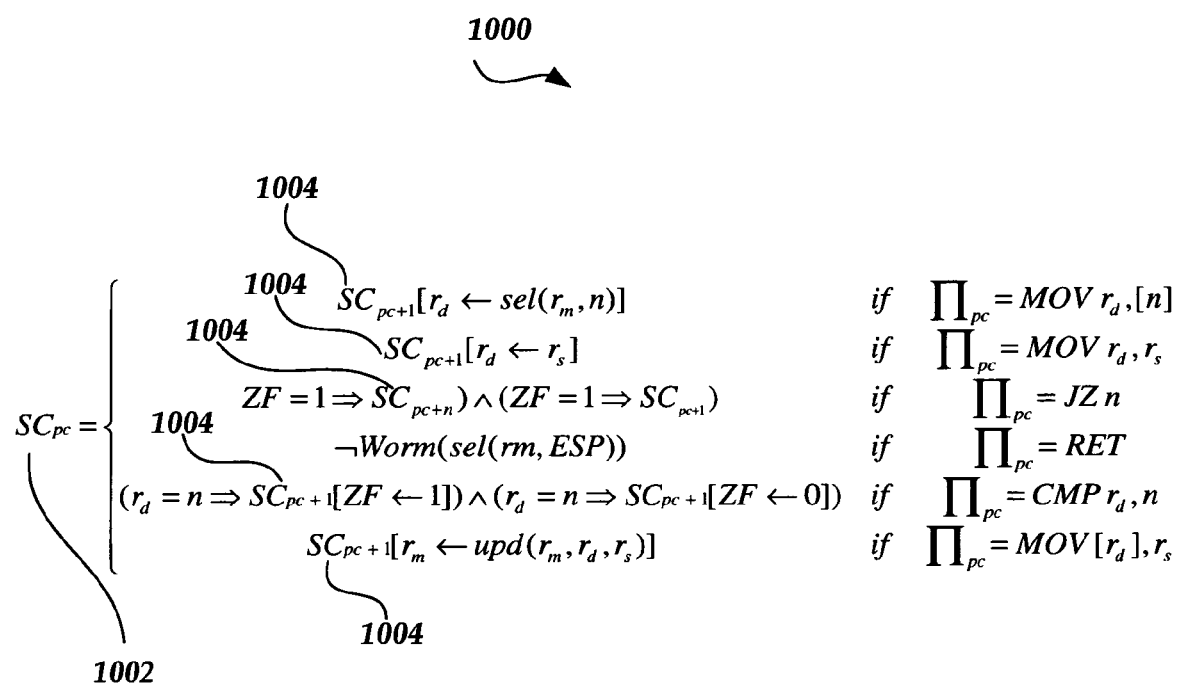
FIG. 10 is a condition listing for an example safety condition.

The example abstract machine 900, when executing return instructions (RET), checks that the memory position pointed to by the stack pointer register (ESP) does not contain a worm. From the definition of the abstract machine such as that shown in FIG. 9, a set of rules may be obtained to mechanically generate the safety condition for a program. FIG. 10 illustrates an example set of rules 1000 corresponding to the abstract machine of FIG. 9. The rules 1000 specify a safety condition parameter $SC_{pc}$ 1002 in terms of a safety condition parameter $SC_{pc+1}$ 1004. In this manner, the safety condition of the program, may be obtained by starting from the last instruction, and processing each preceding instruction until the beginning while checking that the list of instructions represents a valid execution given the program text. More particularly, the last instruction may be examined, then the last two instructions may be examined, and so on.

A precondition may be defined. More particularly, the precondition may reflect the initial state of the program at the start of the vulnerable execution path, such as the state of registers and/or memory. A vulnerability predicate may be defined. For example, a vulnerability predicate may be defined as: Precondition $\Rightarrow \neg$Safety Condition. The vulnerability predicate may then be proven according to the rules of first-order predicate calculus.

Figure 11:
FIG. 11 is an instruction listing of vulnerable instructions.

For example, the vulnerable sequence of instructions provided by the event list of a self-certifying alert may be defined as the instructions 1100 shown in FIG. 11. Using the rules 1000 of FIG. 10, a safety condition SafetyCondition may be defined as:

$$(ECX=10 \Rightarrow \neg Worm(sel(r_m,ESP))) \wedge (ECX \neq 10 \Rightarrow \neg Worm(sel(r_m,1234))) \quad (1)$$

In this manner, at the start of the execution path identified by the event list 1100 of the alert, the value of the ECX register is different for 10 and the memory position 1234 was just written by a network input operation (and therefore is considered 'dirty' and may contain a worm). From the safety condition given by equation (1) above, a precondition may be defined as:

$$(ECX \neq 10 \wedge Worm(sel(r_m,1234))) \quad (2)$$

From the safety condition of equation (1) and the precondition of equation (2), a vulnerability predicate may be generated and proven. Proving the vulnerability may verify the existence of the vulnerability indicated in the event list, which may certify the alert. It should be appreciated that memory location 1234 does not necessarily contain a worm. For example, the fact that the external input operation may arbitrarily change the program's execution may mean that the program is vulnerable to an attack, even though no exploit for that vulnerability exists yet.

Figure 8:
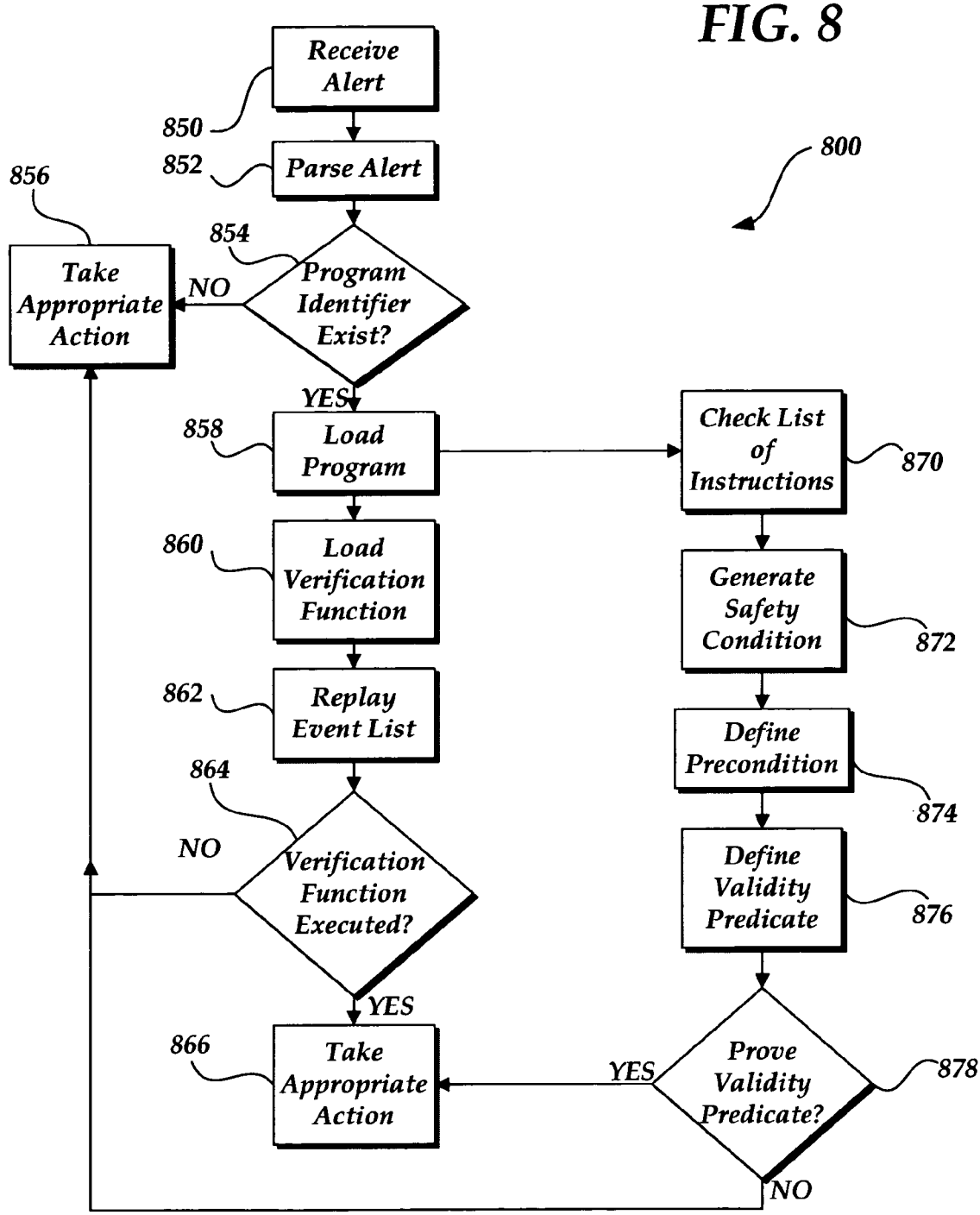
FIG. 8 is a flow chart of an example method of certifying a self-certifying alert.
Figure 16:
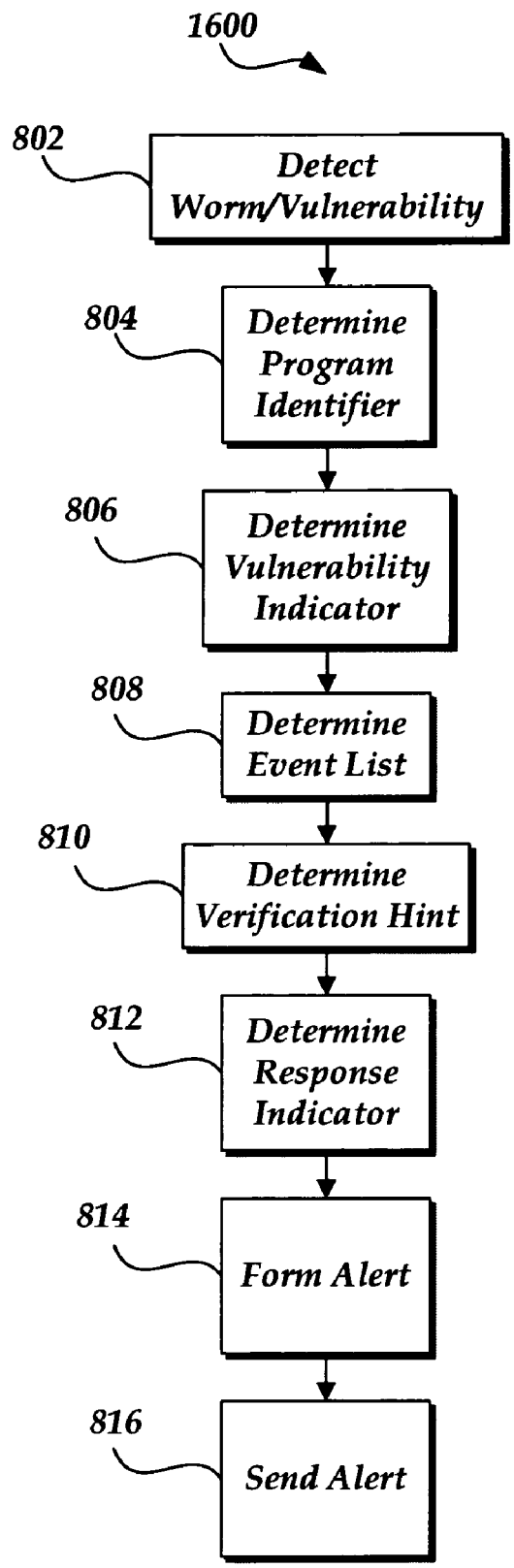
FIG. 16 is a flow chart of an example method of generating a self-certifying alert.

FIG. 16 illustrates an example method 1600 of generating a self-certifying alert, and FIG. 8 illustrates an example method 800 of certifying a self-certifying alert. With reference to FIG. 16, a program vulnerability may be detected 802 such as by a detection module 340. The program identifier for the vulnerable program may be determined 804. The type of vulnerability may be determined 806, and the appropriate vulnerability indicator selected. The event list 808 providing machine verifiable proof of the vulnerability, may be determined 808. As noted above, the event list may be derived from the events logged during a detection process implementing dynamic data flow analysis. The event list may also be pared down or reduced from the events logged during detection to determine a minimum or reduced set of events illustrated the indicated vulnerability, derived from a data flow graph, modified to replace portions with innocuous values, and the like. One or more verification hints may be determined 810 based on the determined event list and/or the vulnerability indicator. In some cases, a response indicator may be determined 812 which may include hints regarding potential solutions to the worm, e.g., patches and/or filters, actual code to implement a patch and/or filter, a worm signature, and the like. The self-certifying message may be formed 814 in any suitable format in accordance with any suitable protocol. The alert may be sent 816 to another node in the network such as through communication media. As noted above, a distribution module 370 may be used to determine the recipient nodes for the self-certified alert.

With reference to FIG. 8, a self-certifying alert may be received 850, such as through communication media, by a receiving node. The alert may be parsed 852 to determine the program identifier and the event list, such as by the alert verification module 360 of FIG. 3. The program identifier may be compared 854 to the programs existing on the receiving node. If the program identifier does not exist in the receiving node, then appropriate action may be taken 856. For example, appropriate action may include dropping the alert and/or forwarding the alert to another node to further distribute of the alert in a communications network.

If the program identifier indicates a program or application of the receiving node, then the receiving node, such as through the alert verification module 360 of FIG. 3 may load 858 the indicated program. In some cases, the program may be loaded into a suspended process. In some cases, the program may be loaded into a 'sandbox' environment which may restrict action, contact with others, and/or other malicious side effects of the indicated vulnerability. Virtual machines can provide a sandbox environment where alert verification may occur. Other sandbox environments may silently discard all output from the running program to limit side effects. In some cases, the receiving node may instruct another computing device, such as an isolated and/or testing device, to load the indicated program and/or certify the self-certifying alert.

A verification function may be loaded 860 into the suspended process' address space. The verification function may return a success indicator if the verification function is called by the indicated program or it may call a response module. The success indicator may be any suitable indicator which indicates execution of the verification function including a visual or auditory signal, exiting the program with a specified value, writing a value to a network interface, signaling a synchronization object, and the like. The structure of the verification function may depend on the type of vulnerability to be illustrated by the event list. In this manner, a vulnerability indicator and/or verification hint may be parsed from the self-certifying alert and used to select and/or generate an appropriate verification function.

The event list may be replayed 862 using the loaded program. As the event list is executed, the verification function may be called, which may indicate the existence of the vulnerability in the indicated program. For example, for a vulnerability indicator indicating an AEC, the hint in the self-certifying alert may indicate the event and/or the offset in that event of the address that will be loaded onto the program counter. The address where the verification function was loaded may be placed at that event and/or offset. In this manner, if the verification function is executed 864 during replay of the event list, then the vulnerability is demonstrated and the alert may be considered certified. In this manner, the receiving node may take 866 appropriate action in response to a certified alert, such as stopping the vulnerable program and/or implementing a suitable patch and/or filter to resolve the vulnerability. If the alert is not certified, e.g., the verification function is not executed, and then appropriate action may be taken 856, such as dropping the message and/or notifying other node(s) of the invalid alert.

In another example, for a vulnerability indicator indicating an ACE alert, the hint in the self-certifying alert may indicate the event and/or the offset in that event of the code that will be injected and executed by the target program. The sequence of instructions "call verification", i.e. a sequence of instructions of the target CPU that instructs the CPU to call the verification function, may be placed at that event and/or offset. In this manner, if the verification function is executed 864 during replay of the event list, then the vulnerability is demonstrated and the alert may be considered certified. In this manner, the receiving node may take 866 appropriate action in response to a certified alert, such as stopping the vulnerable program and/or implementing a suitable patch and/or filter to resolve the vulnerability. If the alert is not certified, e.g., the verification function is not executed, and then appropriate action may be taken 856, such as dropping the message and/or notifying other node(s) of the invalid alert.

In another example, for a vulnerability indicator indicating an AFA alert, the hint in the self-certifying alert may indicate the event and/or the offset in that event of the arbitrary argument that will be passed to a function of the target program. An arbitrary argument, may be placed at that event and/or offset and the verifier may instrument the critical function identified in the AFA alert with a wrapper that checks the value of the arbitrary argument supplied against an actual argument value used in the function call during replay of the non-deterministic events. The wrapper calls the verification function if they match. In this manner, if the verification function is executed 864 during replay of the event list, then the vulnerability is demonstrated and the alert may be considered certified. In this manner, the receiving node may take 866 appropriate action in response to a certified alert, such as stopping the vulnerable program and/or implementing a suitable patch and/or filter to resolve the vulnerability. If the alert is not certified, e.g., the verification function is not executed, and then appropriate action may be taken 856, such as dropping the message and/or notifying other node(s) of the invalid alert.

Rather than literally executing the event list as described above with respect to the event list, the event list may be certified using first order logic. With reference to the method of FIG. 8, a logic safety condition may be generated 872 from the program's instructions for the execution path indicated by the event list. The safety condition may be generated in any suitable manner, such as by defining an abstract machine which simulated the execution of safe programs. A pre-condition may be defined 874 which may reflect the initial state of the program at the start of the vulnerable execution path. A vulnerable predicate may be defined 876 which may then be proven 878 according to the rules of first order predicate calculus. If the predicate is proven, appropriate action may be taken 866 in response to a certified alert, such as stopping the vulnerable program and/or implementing a suitable patch and/or filter to resolve the vulnerability. If the predicate is not proven, then appropriate action may be taken 856, such as dropping the message and/or notifying other node(s) of the invalid alert.

Response

If the execution results do identify the indicated vulnerability, then appropriate action may be taken in response to a certified vulnerability in a program. The response of a computing device may be performed manually and/or automatically in any suitable manner including a response manually directed by a system administrator, by a response module 380 of FIG. 3, and the like. For example, the program may be taken off-line, and/or other counter-measures may be taken. Counter-measures may include generating a patch and/or filter based on the event list and/or vulnerability type indicator and/or verification hint. In this manner, the information within the self-certifying alert may be used to manually and/or automatically generate a patch and/or filter to prevent infection without stopping the application. Moreover, the generated patch/filter may be included in the self-certifying alert for use by a receiving node, such as in the response indicator 710 of FIG. 7.

The event list and/or the verification hints of the self-certifying alert may be used to automatically generate binary modifications to the vulnerable program (e.g., a patch) that will fix the vulnerability.

For example, if the infection involved overwriting a data structure, code may be generated that performs an extra check that prevents this. For example, if the overwriting was due to a buffer overflow or underflow, array bounds checking code may be generated to prevent the overwriting. The generated code may then be applied to the vulnerable program. In another example, a dynamic patch may be generated by keeping a separate copy of the data structure that was overwritten, using the original data structure, and comparing the copy and original data structures before each access to the original data structure before execution. In another example, a boundary condition in a loop may be replaced with another condition (for instance with a condition that ensures that the number of times the loop body is executed is lower).

A worm specific filter may be generated based upon a sufficiently unique alpha-numeric string in the source message bearing the worm, and/or a message having a certain length.

A vulnerability specific filter may be generated that may detect polymorphic worms. In one example, a filter may be installed above the network stack. The vulnerability specific filter may use the application state to determine when to drop incoming traffic. More particularly, general conditions of a filter may be generated by analyzing the execution path listed in the event list of the self-certifying alert, and checking which bytes in the incoming message determine the execution path that leads to infection and which conditions on those bytes are tested in the execution path. These vulnerability specific filters can be generated using a mechanism similar to dynamic flow analysis until the dirty data that would be loaded into the program counter or executed by the worm is written.

In one example, a response module using dynamic data flow analysis to generate a vulnerability centric filter may maintain and/or a data flow graph for each dirty memory portion, such as a memory location and/or register. The response module may also keep data flow graphs for each CPU flag. Each data flow graph may include the full or relevant portion of the sequence of instructions that were used to compute the value at the dirty memory location from values in the messages or other external sources of information. The response module may use control flow analysis to keep track of all conditions that determine the instruction pointer value after executing control transfer instructions, and also conditions used when executing conditional move and set instructions. The conjunction of these conditions may be called the filter condition. The filter condition is initially true and may be updated after every instruction that uses a dirty processor flag or transfers control to an address read from a dirty location. The filter condition is updated to be the conjunction of its old value and the appropriate conditions on the expressions computed by the data flow graphs of the dirty flag and address location. For example, when JZ EAX (jump to the address stored in the EAX register, if the zero flag is set) is executed and the jump is taken, the filter condition is left unchanged if both the zero flag and the EAX register are clean. If the zero flag is dirty, we add the condition that the expression computed by the data flow graph of the zero flag be false. If EAX is also dirty, we also add the condition that the expression computed by EAX's data flow graph be equal to the value currently stored by EAX. If the jump is not taken we add the condition that the expression computed by the data flow graph of the zero flag be true and no condition on EAX's data flow graph is added. After this procedure, the filter condition may be applied to incoming messages to block the worm or variants of the worm that exploit the same vulnerability. In this manner, the filter condition may reduce occurrence of false positives.

The example vulnerable code illustrated in FIG. 15 may be used to illustrate generation of a filter. The code 1500 in FIG. 15 starts by comparing the first byte of the message in the network buffer with a constant (0x31). If it matches, the bytes in the network buffer are copied to a stack-based buffer until a zero byte is found. This is a potential buffer overflow that could overwrite the return address on the stack and it is representative of vulnerabilities in string libraries. A filter for this vulnerability may be generated by running dynamic data flow analysis as discussed above. For example, after executing the first four instructions 1502 of the example instructions of FIG. 15, a detection module implementing dynamic data flow analysis may determine the condition that the first byte in the message should be equal to 0x31. Similarly, executing the loop would derive conditions on a sequence of bytes in the network buffer being different from zero. Applying a filter with these conditions to incoming messages may not generate false positives and may block substantially all worm variants exploiting this vulnerability. Several additional mechanisms may be used to refine the filter condition. In one example, the response module removes conditions on message bytes that appear after the offset identified by the verification hint in the SCA. Since the bytes in the message are usually processed in order, this heuristic is unlikely to introduce false positives. In another example, the response module removes conditions added by the execution of a function when the function returns. The rationale is that these conditions are usually not important after the function returns and the important effects of the function are captured in the data flow graphs of dirty data.

The generated patches or filters may be independently generated by any machine, such as through a response module 380 of FIG. 3, that receives and certifies an alert message. In another example, a generated patch or filter may be included within the alert message, and the patch or filter may be certified or validated in any suitable manner by the receiving node. As shown in FIG. 7, the self-certifying alert may also include a response indicator 710 which may include a suitable response to the verified vulnerability and/or worm attack. For example, the response indicator may provide a description or hint of a suitable patch and/or filter, code implementing a suitable patch and/or filter, and the like.

Distribution of Alerts

A node detecting a vulnerability may send an alert to one or more nodes in the network in communication with the detecting node. For example, a portion of the nodes of a communication network may run vulnerability and/or worm detection modules, which may help distribute the load of detection as well as remove a central target for worms. As noted above, the detection module may include various detection mechanisms, some of which are simple and some complex. A detection node of the network may run the detection module as part of its normal operation, when it is idle, and/or as its primary or exclusive function within the network. It is to be appreciated that any number, such as one, a percentage of, or all nodes of a communication network may be considered a detection node by running a detection module.

As noted above, when a vulnerability and/or worm attack is detected, one response may be to generate an alert, such as a self-certifying alert, and send it to one or more nodes in the network. In this manner, the nodes which have not detected the vulnerability and/or have not been infected with the detected worm may be warned about the worm and/or program vulnerability, and may take appropriate protective action. A self-certifying alert, as noted above, may include machine verifiable information which allows a receiving node to independently verify the authenticity of the alert. In this manner, any node in the network receiving an alert may certify the alert without communication with a certification authority, and the like. Accordingly, a self-certifying alert may be a portion of an architecture which promotes cooperation between mutually untrusting nodes.

Overlay Network

When a worm and/or vulnerability is detected, an alert may be sent rapidly and/or resiliently to other nodes that might be running the vulnerable program or susceptible to the worm attack. The alert may be sent to any number of determinable and/or pre-determined nodes in the network and in any suitable manner. In one example, the alert may be sent using a network overlay which is protected against denial of service attacks by malicious insiders and/or worms. For example, the alert may be broadcast over a structured peer-to-peer overlay.

Peer-to-peer overlays may provide a suitable substrate for the construction of self-organized applications, since peer-to-peer networks may scale to very large numbers of nodes and may be resilient, e.g., may maintain connectivity even when large numbers of nodes crash or disconnect. The following description provides an overview of structured peer-to-peer overlays and illustrates one example in securing the peer-to-peer overlay to increase the probability of delivering an alert to substantially all non-infected nodes in the system. Although the Pastry peer-to-peer overlay is used as an example in the discussion below, it is to be appreciated that any other suitable network and/or peer-to-peer network overlay may be used. Current examples of overlay network types for peer-to-peer networks include Tapestry developed at the University of California at Berkeley, Chord developed at the Massachusetts Institute of Technology, and Pastry developed at Microsoft and Rice University. Tapestry, Chord, and Pastry are toolkits for building distributed systems. CAN, Kademlia, Skipnet, and Viceroy are other systems that are similar. New overlay designs are appearing on a frequent basis.

Structured overlays, such as Pastry, map keys to overlay nodes. Each node is assigned a node identifier which is selected from an identifier space. Keys are selected from the same identifier space. A key is mapped to the node having a node identifier closest to and/or most similar to the key in the identifier space. This node may be called the key's root node. The mapping of keys to nodes may be exposed through a primitive that allows users to send a lookup message to a destination key, for example, using the KBR interface which is discussed further in Dabek, et al., "Towards a common API for structured peer-to-peer overlays," $2^{nd}$ Int'l Workshop on P2P Systems, February 2003, pp. 33-44, which is incorporated herein by reference. A lookup message may be routed through the overlay to the destination key's root node. For example, Pastry selects node identifiers and keys uniformly at random from the set of 128-bit unsigned integers, and then maps an indicated destination key to the active node whose node identifier is numerically closest to the key. For example, the numerically closest node identifier may be the node identifier closest to the destination key modulo $2^{128}$.

The routing state information for nodes may be stored in a routing table. The routing table may associate a node identifier and a network address for a variety of nodes in the address space, at ever increasing levels of detail as the node space indicated in the routing table approaches the node identifier of the node storing the routing table. The leaf set of the node includes information, such as the node identifier and network address, for those nodes nearest or most similar to the node identifier of the node hosting the routing table. Depending on the overlay protocol, the leaf set may be stored in a data structure separate from the routing table and/or may be the lowest level of the routing table.

An example routing table structure is discussed with reference to Pastry. Pastry's routing algorithm interprets the node identifiers and keys as unsigned integers in base $2^b$, where b is a parameter with a typical value of 4. Based on this interpretation, the routing table is a matrix with 128/b rows and $2^b$ columns. The entry in row r and column c of the routing table contains a node identifier that shares the first r digits with the local node's node identifier, and has the (r+1)th digit equal to c, assuming that the first row in the routing table represent r=0. If there is no such node identifier, e.g., no active node in the network is using that node identifier, then the entry may be null. Since node identifiers may be assigned uniformly and randomly through the identifier space, the average number of non-empty entries in the routing table may be approximated as the $(2^b-1)*\log$ (having a base of $2^b$) of the number of nodes in the peer-to-peer network. The leaf set of a Pastry node may contain the l/2 closest node identifiers to the left of the local nodes' node identifier and the l/2 closest node identifiers to the right of the local nodes' node identifier, where l is a parameter with a typical value of 8. The set of leaf sets of each node in the peer-to-peer network then connect the overlay nodes in ring. In this manner, a message may be routed in the peer-to-peer network by forwarding the message to nodes with progressively longer prefixes which match the destination key.

Figure 12:
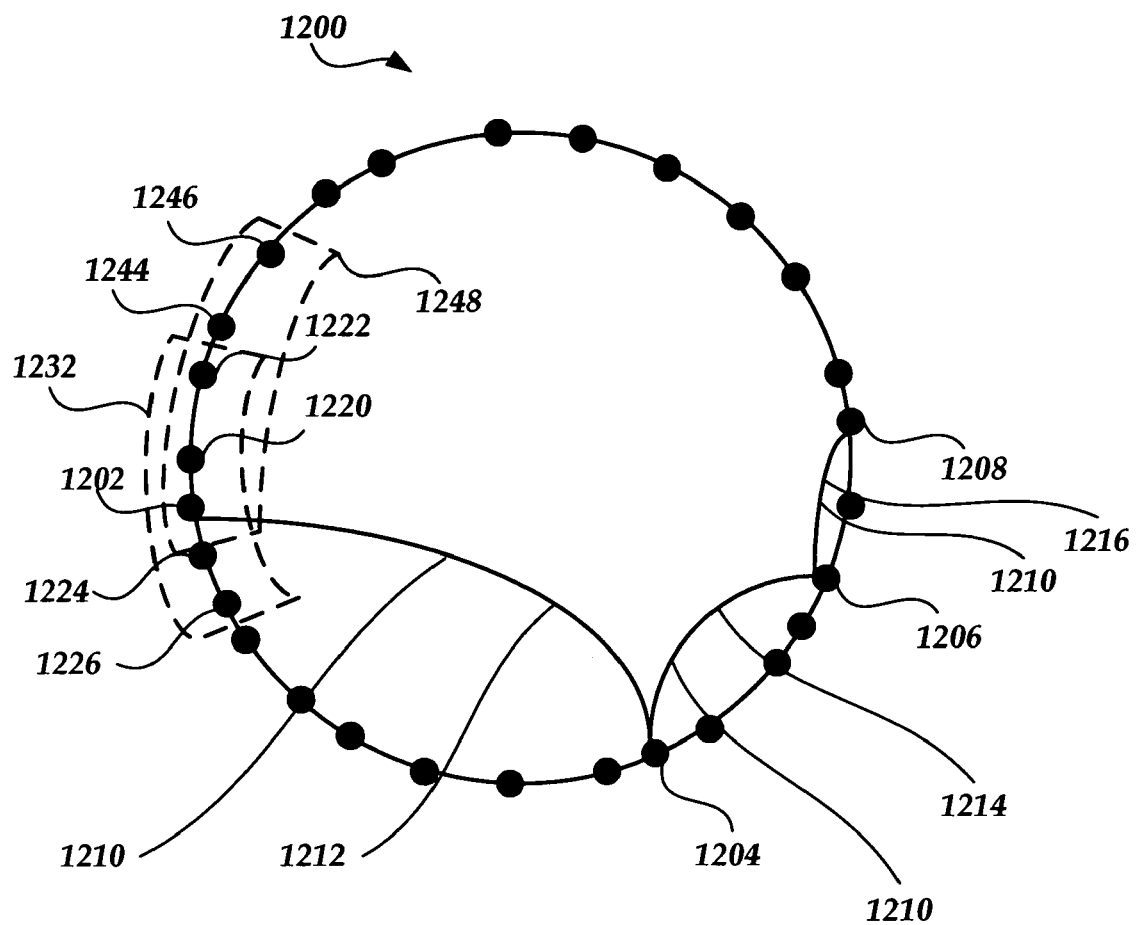
FIG. 12 is a schematic diagram of a peer-to-peer network.

FIG. 12 shows an example structured overlay network 1200 having b=2 and l=4. The structured overlay network diagram illustrates a route 1210 of a lookup message originating at node 1202. The lookup message contains a key which is matched to the node identifier closest to the indicated key, e.g., the node storing the desired information associated with the key is the node having the node identifier closest to the key. For example, node 1202 may have a node identifier of 203231 and the key of the lookup message may be 323310. To send the lookup message, the originating node 1202 may search a level of its routing table for a known node identifier closest to the destination key of the lookup message. More particularly, node 1202 may search the first row of its routing table for a node identifier starting with digit 3, which is the first digit of the key. The originating node may find node identifier 313221 at the routing table location of a node identifier starting with 3. Referring to FIG. 12, the originating node 1202 may then forward the lookup message using communication media over route 1212 to node 1204 at the address associated with the node identifier (313221) in its routing table. Node 1204 then receives the lookup message and may search its routing table (e.g., the second level of the table) for a node identifier starting with 32, e.g., matching the first two digits of the lookup message key 323310. The node 1204 may find node identifier 322021 at the location of a node identifier starting with 32. Node 1204 may then forward the lookup message using communication media over route 1214 to node 1206 at the address associated with the node identifier (322021) in its routing table. Node 1206 then receives the lookup message and may search its routing table, and so on until the lookup message reaches the key's root node 1208. In many cases, routing may take approximately $$\frac{2^b - 1}{2^b} \log_{2^b} N$$

hops on average if the distribution of node identifiers is sufficiently random and uniform (where the parameter N is the number of nodes in the network and b is the base of the node identifier space).

Securing the Network

To increase the resiliency of the alert distribution through a structured network overlay, one or more security mechanisms may be used to secure the structured peer-to-peer overlay network. Any security measure may be used as appropriate. The security measure may include, for example, the techniques described in Castro, et al., "Secure routing for structured P2P overlay networks," 5$^{th}$ Usenix Symp. On Operating System Design and Implementation, December 2002, pp. 299-314, which is incorporated herein by reference. Additional security mechanisms may reduce information disclosure, reduce denial of service (creating congestion at the overlay level), send broadcast alerts to non-infected nodes even when a large percentage of the overlay nodes are infected, and the like.

One security measure may assign node identifiers to nodes entering the peer-to-peer network. The node identifier may be assigned by any suitable source, such as one or more trusted certification authorities (CAs). The certification authority may ensure that node identifiers are chosen substantially randomly from the node identifier space and/or may prevent nodes from forging a node identifier. The certification authority may use techniques to control the availability of signed certificates authenticating a node identifier, for example, by requiring payment, proof of owning a particular product, proof of a financial gift to charity, and the like. Assigning node identifiers using a certification authority may reduce Sybil attacks. To protect the certification authority from attack, the one or more certification authorities may be offline and/or not involved in the normal operation of the overlay network.

One alternative and/or additional security measure may include enabling secure routing table maintenance which may be accomplished in any suitable manner. For example, constraints may be imposed on the set of node identifiers which can fill each field in a routing table. In a Pasty routing table of a node with identifier i, the field at row r and column c may be constrained to contain any node identifier that shares the first r digits with the node identifier i and has the value c in the r+1$^{st}$ digit. The remaining digits of the node identifier entry may be irrelevant to routing. However, the entry in the routing table may be further constrained to indicate or contain the closest node identifier to a point p in the domain. The point p may be defined as a node identifier location in the node space which shares the first r digits with the node identifier i, has the value c in the r+1$^{st}$ digit, and has some determinable series of digits restricting the node identifier of a valid point p in the domain. For example, the point p may be defined as a node identifier which shares the first r digits with the node identifier i, has the value c in the r+1$^{st}$ digit, and had the same remaining digits as i. Tying routing table entries to virtual points in the identifier space may reduce acceptance of a routing update sent by a malicious node and received by an honest node if the update does not satisfy the virtual point constraint. In this manner, the number of routing table entries that can be occupied by malicious nodes may be bounded. This technique is described further in Castro et al., "Secure routing for structured peer-to-peer overlay networks," 5$^{th}$ Usenix Symp. On Operating System Design and Implementation, Boston, Mass., December, 2002, pp. 299-314, which is incorporated herein by reference.

An additional or alternative security measure may include avoiding information disclosure. More particularly, crawling of the network overlay may be disallowed and/or opposed. Accordingly, access to overlay membership information may be reduced. Any suitable technique may be used to avoid leaking membership information such as constraining the entries in the routing table. For example, a node with a node identifier of i may need to fill a slot in its routing table at row r and column c, because the slot became empty due to node failure, departure from the overlay by another node, and/or the node is joining and initializing its routing table). To fill the slot, the node may route a request message to the identifier s that defines the constraint for that slot, e.g., the identifier that is equal to the node identifier except that it has value c in the r+1$^{st}$ digit. When such a request is delivered at a node, the receiving node may check if there is any node in its routing table and/or leaf set closer to the identifier s. The receiving node may also check if the identifier s does not represent a valid point p for the requestor's node identifier. If so, the receiving node may discard the request, forward the request to the closer node, and/or take any other suitable action. In this manner, malicious nodes may discover only those nodes which fulfill the routing table entry constraints. In some cases, other applications may be limited from running on top of the overlay that support distribution of alerts, since in some cases, the application may leak information about overlay membership.

Another alternative and/or additional security measure may reduce exposing identities of overlay neighbours when a node is compromised. For example, the overlay may be run inside the operating system kernel, in a virtual machine monitor, in a hardware chip, and the like.

Another alternative or additional security measures may reduce congestion of message traffic between nodes in the peer-to-peer network, which may reduce the occurrence and/or effect of denial of service attack to the network. Any one or more of a variety of suitable mechanisms may be used to reduce congestion in the network. For example, a node may be prevented from injecting an unbounded number of messages into the overlay. Additionally or alternatively, overlay messages may be signed and each node may enforce a limit on the rate of messages that it processes for other nodes in the overlay identified by the signature of the message. For example, a certification authority may sign a certificate containing both the node identifier and the public key of each node. When a sending node sends an overlay message, the node may sign the message using its private key and may route the message. The node's certificate signed by the certification authority may be attached to the message. Each node that routes the message may verify that the sending node is the source of the message (e.g., verify the signature of the message using the certificate) and may record the number of messages (e.g., in message count parameter) that it has routed for that particular node. The message count parameters may be compared with a predetermined threshold value which may limit the number of messages routed from the sending node. In another example, the rate at which any given node may insert messages into the network may be bounded by applying rate limits on each neighbour link (e.g., those nodes which have node identifiers similar to the local node's node identifier). If node identifiers are assigned by a certification authority, then changing a node's neighbours may be limited.

Resilient Distribution

Distribution of an alert, e.g., identifying receiving nodes for the alert may be determined in any suitable manner. For example, as shown in FIG. 3, a distribution module 370 may be triggered in response to input from an alert module 350 if an alert is generated, and/or in response to input from an alert verification module 360 if a received alert is verified. Distribution of an alert indicating worm attack and/or program vulnerability may be resilient to attempts of one or more routing nodes blocking propagation of the alert. A blocking node may be a malicious node purposefully blocking alert propagation, or the node may be compromised from participating in routing of messages e.g., the node may be infected with the worm. Thus, a distribution scheme for sending alerts to nodes in a peer-to-peer network may send an alert to the same node through multiple overlay paths. More particularly, a node may receive multiple alerts with each alert originating at a different node, and/or being sent over different routing paths.

if a single path were used, the probability that the path may be blocked may be approximated by:

$$P(\text{block}) = 1 - (1-f)^{pathlength} \quad (3)$$

where the parameter f is the fraction of nodes in the network which are blocking routing. Accordingly, if a plurality of independent paths to every node are used to send the alert, for example by building a plurality of independent multicast trees, then the probability that at least one path contains only honest and/or capable nodes may be approximated by:

$$P(\text{clear}) = 1 - binom(0{:}p,(1-f)^{log_{2^b}N}) \quad (4)$$

where N is the number of nodes in the network, $log_{2^b} N$ is the tree depth, p is the number of independent paths to each node, and binom is the binomial distribution with 0 successful routes, p trials, and the probability of routing successfully in each trial is $(1-f)^{log_{2^b}N}$. Accordingly, to achieve a 90% probability of reaching a given node, with b=4 and 50 percent of the nodes compromised on a 100,000 node network, approximately 40 paths would need to be chosen. If 40 paths are used to forward a single alert to each node in the network, then the message cost may be approximated by the value of p*N.

The independent paths selected to route a message may be chosen in any suitable manner. For example, random paths may be chosen. In another example, every node may send the alert to all or a portion of the entries in its routing table. In a peer-to-peer network with b=1, a complete routing table broadcast to all routing table entries may have a message cost of approximately $(log_{2^b}N)N$ messages. The complete routing table broadcast may be likely to reach every node for which a good path exists to the source of the alert. In another example, the receiving nodes may be identified by entries in the routing table below a predetermined level. Alternatively or additionally, the node sending the alert may send the alert to each entry in the leaf set.

Those nodes receiving and certifying the alert may forward the alert to other nodes according to the distribution technique, e.g., multiple random paths, to entries in the routing table entries, to entries in the leaf set, and the like. For example, if a node forwards a certified alert to all nodes in its routing table, each receiving node may receive the alert from every node which lists the receiving node in its routing table, thus, forming multiple paths to every node in the network. Accordingly, the alert may be distributed to substantially all nodes in a network and multiple alerts may be routed to each node through different paths to reduce blocking of the alert.

Additionally, a node may verify the origination of the alert and/or the contents of an alert, e.g., indication of a vulnerability in the program, before forwarding the alert. If the origination of an alert cannot be verified but is found to describe a vulnerability that is verified, then the node may or may not forward the alert. If the origination of an alert can be verified and is found not to describe a vulnerability, then the node may drop the alert.

A node may compare an alert with alerts that have already been forwarded. If the alert describes the same vulnerability of a previously forwarded alert, the node may not forward the alert. To reduce perpetual sending of the same alert message, an alert may include an alert identifier which may be examined to determine if the alert is a duplicate, a timeout indicator indicating a particular amount of time to forward the alert, a counter of the number of forwards limiting the number of times an alert is forwarded, or any other suitable indicator.

When a node joins the overlay, the joining node may request for one or more nodes of the overlay, such as those present in its leaf set and/or routing table, to forward relevant alerts. The relevant alerts may be any suitable alert stored by the nodes in the overlay, including, for example, certified alerts since the joining node last left connection to the overlay, alerts in a predetermined period of time, and the like. The node receiving an alert request may return all or a portion of the requested alerts. Additionally or alternatively, the node receiving the alert request may send a summary of the alerts it has received and/or stored. The joining node may select the portion of the identified alerts in the summary and request those specific alerts from the receiving node and/or other nodes in the network overlay. The alert summary may take any suitable form as appropriate.

With reference to the example peer-to-peer network of FIG. 12, node 1202 may have a leaf set 1232 containing entries for nodes 1220, 1222, 1224, 1226. Node 1202 may send an alert to nodes 1220, 1222, 1224, 1226 and each of those nodes may forward a certified alert to nodes included in their leaf sets. For example, node 1222 may have a leaf set 1242 containing nodes 1202, 1220, 1244, 1246. In this manner, node 1220 may receive an alert from both nodes 1202 and node 1222. Moreover, as each succeeding leaf set is sent an alert, the alert is distributed around the network.

Moreover, the distribution system may automatically scale as the size of the overlay network grows or shrinks. The routing table and/or leaf set distribution technique may allow any node of the peer-to-peer network to join or leave the worm containment system independently. Moreover, the distribution of a self-certifying alert may not require extensive agreements between partners. More particularly, each node does not depend on a single point, e.g., an ISP or other central server, to notify and/or to protect them from infection.

Since the detection, alert certification, alert distribution, and/or the response module of the worm containment system does not depend on a single central processor, then no central infrastructure may act as a target for dedicated attacks and/or become a single point failure. In some cases, to further decentralize the infrastructure of the worm containment system, every node that is part of the containment system (e.g., part of a leaf set of a node of a peer-to-peer network) may be expendable. In this manner, all or at least a portion of the nodes in the containment system may perform the same types of functions (although they can, and may, be implemented differently).

Other distribution or diffusion techniques may be appropriate, such as Internet Protocol multicast and pull-based mechanisms.

Deployment Scenarios

As noted above, one or more nodes of the overlay network may run the detection module to detect worm attacks and/or vulnerabilities in software programs. The detection module may be run by any combination of one or more dedicated computing devices (e.g., in a honeypot type of deployment), one or more computing devices when they are idle (e.g., as part of a screen saver type of application), and one or more nodes as part of normal production deployments.

The overlay network that is used to broadcast alerts when a worm is spreading may be deployed over the whole Internet or other communication network, deployed over the nodes of a single corporate local network, deployed over the nodes defined as a particular class of users (e.g., registered users of a software package), and the like.

As noted above, the alert messages may be automatically generated when a vulnerability or worm attack is detected. Moreover, an alert may be automatically forwarded in accordance with a predetermined distribution protocol upon receiving an alert message and/or upon certification of an alert message. In other cases, manual or human interaction may provide oversight and/or authorization to generate and/or forward an alert.

If every or at least a portion of the nodes of a network are involved in the detection, alert certification, and/or alert distribution in a containment system, then there may be a likelihood that attackers will infiltrate the system even before large scale attacks take place. Given that any node in the system may be malicious and that each node may be owned by a different entity, there may be no trust between the nodes, even if the nodes have identities which are signed by a certification authority. Yet, the nodes may cooperate on the task of stopping a worm exploiting unknown vulnerabilities. Identifying those nodes which are malicious may introduce mechanisms that may be exploited by malicious nodes. Accordingly, the containment system architecture may be developed, as described above, to tolerate and/or design around existing malicious but unknown nodes within the network.

In operation, a worm containment architecture may provide detection, alert generation, alert certification, alert distribution, and/or response to a worm or program vulnerability. More particularly, in some cases, each node of the network under protection by the containment system may participate in at least one of the detection, alert generation, alert certification, alert distribution, and/or response to an attack or vulnerability. For example, with reference to FIG. 3, a detection node of the peer-to-peer network 310 may include a detection module 340, an alert module 350, a distribution module 370, and a response module 380. As noted above, the detection module may detect worm attacks and/or software vulnerabilities such as by using dynamic data flow analysis. Any appropriate runtime analysis system may be used to track events.

Upon detection of a worm attack and/or program vulnerability, the detection module 340 may communicate with a response module 380 to trigger one or more protections measures. To communicate the identified worm and/or program vulnerability to non-infected nodes, the detection node 310 may use an alert module 350 to generate an alert message 330. As noted above, the alert message may be self-certifying and/or may include one or more of a vulnerable program identifier, a vulnerability type indicator, an event list, one or more verification hints, and a response indicator. The alert module 350 may communicate with the distribution module 370 to send the alert message 330 to one or more nodes of a network in accordance with a distribution protocol. For example as noted above, the alert message may be distributed to the nodes identified in the routing table maintained in accordance with a network overlay protocol. Additionally or alternatively, the alert message may be distributed to all nodes identified in the leaf set maintained in accordance with a peer-to-peer overlay protocol.

As shown in FIG. 3 the alert message 330 may be sent to a receiving node 320 identified in the leaf set of node 310. The receiving node may receive the alert message 330 and use an alert verification module 360 to certify the alert message. If the alert is certified, the receiving node 320 may use a response module 380 to trigger one or more protection measures. To distribute the alert 330 through the communication network, the receiving module 320 may use a distribution module 370 to forward the alert message 330 to one or more nodes of a network in accordance with a distribution protocol. For example as noted above, the alert message may be distributed to the nodes identified in the routing table and/or leaf set maintained in accordance with a peer-to-peer overlay protocol.

Figure 13:
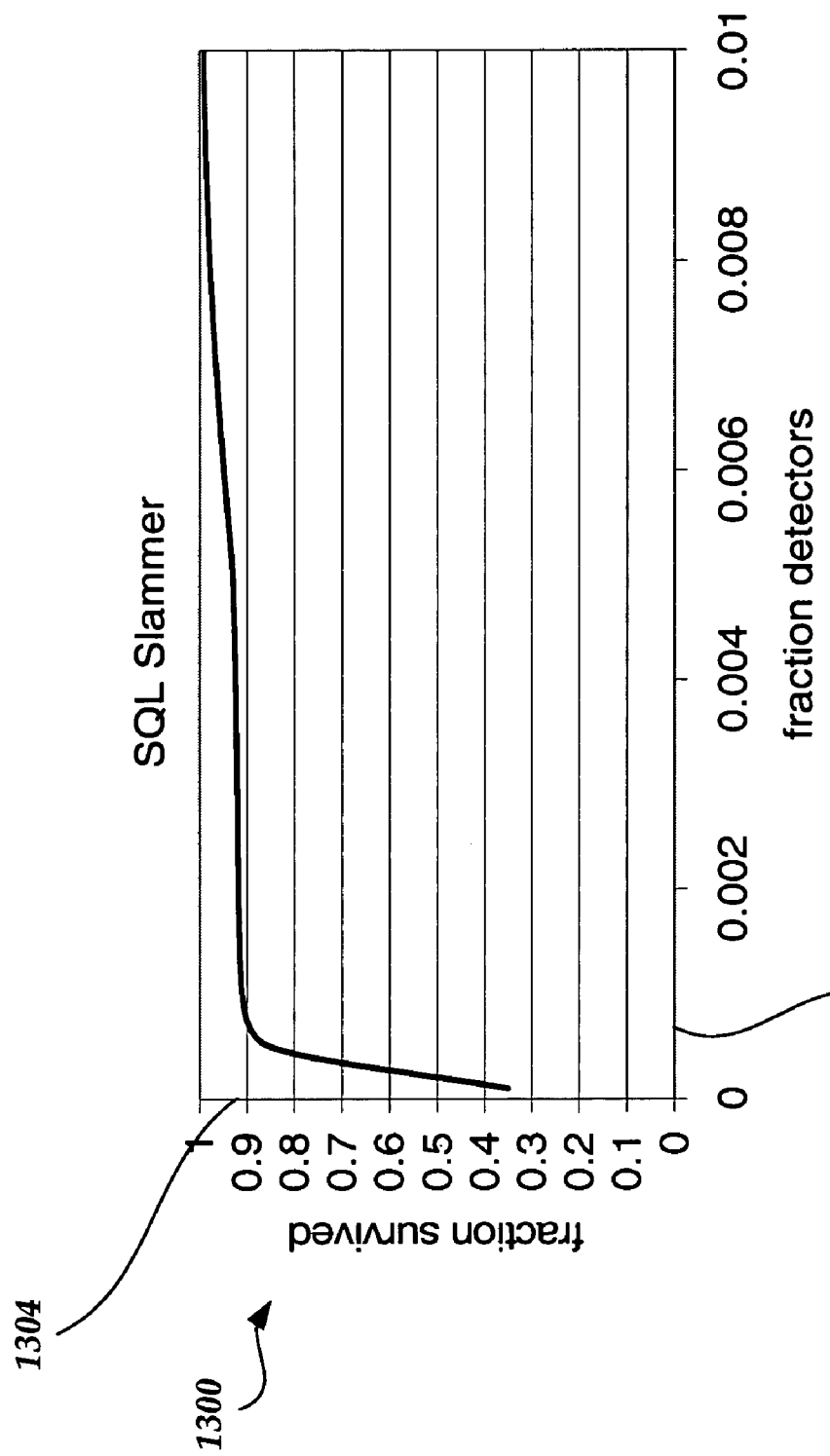
FIG. 13 is an example graph illustrating a fraction of surviving nodes given a fraction of detecting modules in an example peer-to-peer network.

In one experiment, the fraction of nodes that survive an attack by a worm similar to SQL Slammer may be determined as function of the fraction of detectors in the system. In one experiment, a population or 100,000 nodes (e.g., host computing devices) were part of the network and 10 were simulated as being infected. Moreover, 10% of the nodes in the network were assumed to be malicious, even before the worm attack. The infection rate p was estimated to be approximately 0.117, which is believed to be approximate to the SQL Slammer's observed behavior on the Internet. Example results of the experiment are illustrated in the graph 1300 of FIG. 13 with the fraction of detectors being indicated along axis 1302 and the fraction of surviving nodes being indicated along axis 1304. The graph of FIG. 13 shows that a small fraction of detector nodes in the network, e.g., 0.001, may be sufficient to contain the worm infection to less than 10% of the vulnerable population.

Having described and illustrated the principles of our invention with reference to the illustrated embodiments, it will be recognized that the illustrated embodiments can be modified in arrangement and detail without departing from such principles. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. One or more computer readable storage media containing computer readable instructions that, when implemented, perform a method comprising:
   a) receiving an instruction to write or store received information in a first portion of a memory of a computing system;
   b) associating a first dirty indicator with the first portion of the memory, the first dirty indicator indicating 'dirty' if the received information is received from an untrusted source or from a fourth portion of the memory with a fourth dirty indicator indicating 'dirty';
   c) receiving an instruction to load the received information into a program counter or to execute the received information; and d) providing an indication of a program vulnerability if the first dirty indicator indicates 'dirty'.

2. The computer readable storage media of claim 1, wherein the received instruction to load or execute received information includes one or more instructions to move data, one or more arithmetic and logic instructions, or one or more instructions that change a control flow of a program.

3. The computer readable storage media of claim 1, wherein providing an indication of a program vulnerability includes generating a patch or filter based on the received information.

4. The computer readable storage media of claim 1, wherein providing an indication of a program vulnerability includes sending a self-certifying alert to at least one other node.

5. The computer readable storage media of claim 4, further comprising retrieving a node identifier identifying the at least one other node from a set of neighbors in an overlay network.

6. The computer readable storage media of claim 1, further comprising associating an input event identifier with the first portion of memory, the input event identifier identifying a source of the received information.

7. The computer readable storage media of claim 6, wherein the first dirty indicator includes the input event identifier.

8. The computer readable storage media of claim 7, further comprising calculating a new data from the received information, storing the new data in a second portion of the memory, and associating a second dirty indicator with the second portion of the memory, the second dirty indicator indicating 'dirty' if the received information is received from the untrusted source or from the fourth memory portion with the fourth dirty indicator indicating 'dirty'.

9. The computer readable storage media of claim 8, wherein the second dirty indicator includes a first data flow graph indicating at least one step of calculating the new data from the received information or a second data flow graph in the fourth dirty indicator.

10. The computer readable storage media of claim 1, wherein the first portion of the memory includes at least one of a group consisting of a CPU register, a memory page, and a memory location in the page.

11. The computer readable storage media of claim 10, wherein the first portion of the memory includes a memory location, the memory location being a portion of a first memory page, the method further comprising associating a page dirty indicator with the memory page based on the first dirty indicator.

12. The computer readable storage media of claim 1, wherein receiving an instruction to load the received information into a program counter or to execute the received information includes receiving an instruction to execute the received information, if the first dirty indicator does not indicate 'dirty', then examine a third dirty indicator associated with a third portion of the memory storing an instruction referenced by the received information.

13. The computer readable storage media of claim 12, further comprising providing an indication of a program vulnerability if the third dirty indicator indicates 'dirty'.

14. A method comprising:
a) maintaining at least one contamination data store which tracks whether a source of a stored value is an untrusted source or a trusted source;
b) before loading the stored value into a program pointer, examining the at least one contamination store;
c) if the at least one contamination data store indicates that the stored value is from a trusted source, loading the stored value;
d) if the at least one contamination data store indicates that the stored value is from an untrusted source, refusing to automatically load the stored value; and
e) in response to refusing to automatically load the stored value, determining a storage location of the stored value and determining an input source of the stored value from the at least one contamination data store.

15. The method of claim 14, wherein the at least one contamination data store includes a data flow graph indicating a set of steps used to calculate the stored value.

16. The method of claim 15, wherein determining an input source includes determining an input source and an offset within the input source of the stored value.

17. The method of claim 14, further comprising if the at least one contamination data store indicates that the stored value is from a trusted source, determining if an instruction pointed to by the stored value is from a trusted source; and executing the instruction only if the stored value and the instruction are both from at least one trusted source.

18. One or more computer readable storage media containing computer executable components comprising:
a) means for detecting a worm attack using dynamic data flow analysis;
b) means for generating an alert, in response to a detection of a worm attack;
c) means for distributing the alert, in response to generation of the alert.

19. The computer readable storage media of claim 18, further comprising means for generating a patch or filter based on the dynamic data flow analysis of the means for detecting.

20. The computer readable storage media of claim 18, wherein the means for generating an alert includes means for generating a self-certifying alert based at least in part on the dynamic data flow analysis of the means for detecting.

* * * * *